US012665442B2

(12) United States Patent
Shi et al.

(10) Patent No.: US 12,665,442 B2
(45) Date of Patent: Jun. 23, 2026

(54) APPARATUS, SYSTEMS AND METHODS FOR SCALABLE 3D WIRELESS CHARGING UTILIZING MULTIPLE COILS

(71) Applicant: GaN Systems Inc., Ottawa (CA)

(72) Inventors: Tiefeng Shi, San Jose, CA (US); Paul Wiener, Pleasanton, CA (US)

(73) Assignee: GaN Systems Inc., Ottawa (CA)

( * ) Notice: Subject to any disclaimer, the term of this patent is extended or adjusted under 35 U.S.C. 154(b) by 1192 days.

(21) Appl. No.: 17/579,941

(22) Filed: Jan. 20, 2022

(65) Prior Publication Data

US 2022/0247219 A1 Aug. 4, 2022

Related U.S. Application Data

(60) Provisional application No. 63/143,995, filed on Feb. 1, 2021.

(51) Int. Cl.
*H02J 50/12* (2016.01)
*H02J 50/00* (2016.01)
*H02J 50/40* (2016.01)

(52) U.S. Cl.
CPC ............ *H02J 50/12* (2016.02); *H02J 50/005* (2020.01); *H02J 50/402* (2020.01)

(58) Field of Classification Search
None
See application file for complete search history.

(56) References Cited

U.S. PATENT DOCUMENTS

| | | | |
|---|---|---|---|
| 4,926,147 A | 5/1990 | Oppelt | |
| 7,893,564 B2 * | 2/2011 | Bennett | H02J 50/12 |
| | | | 320/108 |

| | | |
|---|---|---|
| 8,106,539 B2 | 1/2012 | Schatz et al. |
| 8,344,552 B2 | 1/2013 | Cook et al. |
| 8,461,719 B2 | 6/2013 | Kesler et al. |
| 8,643,326 B2 | 2/2014 | Campanella et al. |
| D705,745 S | 5/2014 | Kurs et al. |
| D722,048 S | 2/2015 | Kurs et al. |

(Continued)

FOREIGN PATENT DOCUMENTS

| | | |
|---|---|---|
| WO | 2015018334 A1 | 2/2015 |
| WO | 2017084599 A1 | 5/2017 |
| WO | 2018066789 A1 | 4/2018 |

OTHER PUBLICATIONS

GaN-Systems Inc., "Power Amplifier and Coil Design Optimization for Large Air Gap Applications" AirFuel Alliance Development Forum Mar. 12-13, 2019; 18 pages.

(Continued)

*Primary Examiner* — Tynese V McDaniel
(74) *Attorney, Agent, or Firm* — WORKMAN NYDEGGER

(57) ABSTRACT

A wireless power transfer (WPT) system is provided to drive multiple resonator coils utilizing one power amplifier. The WPT system may include a power amplifier, a differential 1:N power divider, impedance inversion circuits and multiple resonator coils. The WPT system may further include auto-tuning circuits with sensors that facilitate the efficient driving of the multiple resonator coils. As well, there is provided various 3D shaped coil topologies that are comprised of two or more separate coils. The 3D coil topology designs each provide a particular 3D magnetic field for wireless charging.

9 Claims, 25 Drawing Sheets

(56) References Cited

U.S. PATENT DOCUMENTS

| | | | | |
|---|---|---|---|---|
| D734,731 | S | 7/2015 | Kurs | |
| 9,385,790 | B1* | 7/2016 | Mukherjee | H04B 5/266 |
| D769,835 | S | 10/2016 | McCauley | |
| D770,402 | S | 11/2016 | McCauley | |
| D770,403 | S | 11/2016 | McCauley | |
| 9,685,792 | B2 | 6/2017 | Yang et al. | |
| 10,224,752 | B2 | 3/2019 | Chlebosz et al. | |
| 10,404,075 | B2* | 9/2019 | Walley | H02J 50/12 |
| 10,410,789 | B2 | 9/2019 | Kurs | |
| 2010/0244767 | A1* | 9/2010 | Turner | H02J 50/402 |
| | | | | 320/108 |
| 2010/0289341 | A1* | 11/2010 | Ozaki | H02J 50/12 |
| | | | | 307/104 |
| 2011/0063048 | A1* | 3/2011 | Floyd | H03F 3/602 |
| | | | | 333/136 |
| 2012/0080957 | A1* | 4/2012 | Cooper | H02J 50/80 |
| | | | | 307/104 |
| 2012/0248893 | A1 | 10/2012 | Teggatz et al. | |
| 2012/0267960 | A1 | 10/2012 | Low et al. | |
| 2012/0313446 | A1 | 12/2012 | Park et al. | |
| 2013/0026159 | A1* | 1/2013 | Shi | H05B 6/66 |
| | | | | 29/846 |
| 2013/0241309 | A1 | 9/2013 | Arnold et al. | |
| 2013/0300205 | A1* | 11/2013 | Tzanidis | H04B 5/79 |
| | | | | 307/104 |
| 2014/0084688 | A1* | 3/2014 | Tzanidis | H02J 50/10 |
| | | | | 307/42 |
| 2014/0091633 | A1* | 4/2014 | Walley | H02J 50/60 |
| | | | | 307/104 |
| 2014/0091755 | A1* | 4/2014 | Walley | H02J 50/90 |
| | | | | 320/108 |
| 2014/0162554 | A1* | 6/2014 | Sankar | H04B 5/79 |
| | | | | 455/41.2 |
| 2014/0184155 | A1 | 7/2014 | Cha | |
| 2014/0327409 | A1 | 11/2014 | Lee et al. | |
| 2015/0054344 | A1 | 2/2015 | Ng et al. | |
| 2015/0280785 | A1 | 10/2015 | Brauchler et al. | |
| 2016/0111208 | A1 | 4/2016 | Park et al. | |
| 2016/0336784 | A1* | 11/2016 | Yang | H02J 50/12 |
| 2017/0069949 | A1* | 3/2017 | Yoon | H01P 5/12 |
| 2017/0085097 | A1* | 3/2017 | Xiao | H02J 50/12 |
| 2017/0288738 | A1* | 10/2017 | Lee | H04W 52/52 |
| 2018/0152059 | A1 | 5/2018 | Yang et al. | |
| 2018/0212451 | A1* | 7/2018 | Schmidt | H02J 50/80 |
| 2018/0262050 | A1* | 9/2018 | Yankowitz | H02J 50/40 |
| 2019/0036380 | A1 | 1/2019 | Garrity | |
| 2019/0148971 | A1 | 5/2019 | Bae | |
| 2019/0288609 | A1* | 9/2019 | Tsuru | H02J 50/20 |
| 2019/0372399 | A1* | 12/2019 | Park | H02J 50/90 |
| 2021/0184500 | A1* | 6/2021 | Shi | H01F 5/003 |
| 2022/0115913 | A1* | 4/2022 | Esteban | H02J 50/12 |
| 2022/0302846 | A1* | 9/2022 | Liu | H02M 3/158 |
| 2023/0075393 | A1* | 3/2023 | Shi | H02J 50/80 |
| 2024/0006928 | A1* | 1/2024 | Inoue | B60L 53/39 |
| 2024/0388134 | A1* | 11/2024 | Suarez Sandoval | H02J 50/402 |
| 2024/0399899 | A1* | 12/2024 | Molina | B60L 53/12 |
| 2025/0105669 | A1* | 3/2025 | Sjoeroos | H02J 50/12 |

OTHER PUBLICATIONS

Lee, Seung-Hwan et al., "6.78 MHz, 50 W Wireless Power Supply Over a 60-cm Distance Using a GaN-Based Full-Bridge Inverter"; Jan. 24, 2019; Energies 2019, 12, 371; www.mdpi.com/journal/energies; doi:10.3390/en12030371; 19 pages.

Shi, Tiefeng et al., "High power Constant Current Class EF2 GaN Power Amplifier for AirFuel Magnetic Resonance Wire-less Power Transfer Systems" 2018 PCIM Europe conference, Jun. 7, 2018;4 pages.

GaN-Systems Inc., "Highly Efficient High Power PA Design for Resonant WPT" AirFuel Alliance Development Expo, Mar. 2018; 23 pages.

Lee, Seung-Hwan et al.,"Development of 50W High Quality Factor Printed Circuit Board Coils for a 6.78MHz, 60cm Air-gap Wireless Power Transfer System"; J. Korean Soc. For Railway vol. 19 No. 4, pp. 468-479, Aug. 2016.

Clearman, Chris et al. "Exploring the evolution and optimization of wireless power transfer" C2000TM Real-time MCU, Texas Instruments, Jul. 2018; 9 pages.

Sah, Ajay Kumar, "Design of Wireless Power Transfer System via Magnetic Resonant Coupling at 13.56MHz", Proceeding of IOE Graduate Conference, vol. 1, Nov. 2013 pp. 202-210.

Liu, Suqi et al., "Dynamic impedance compensation for wireless power transfer using conjugate power" AIP Advances 8, 025210 (2018); https://doi.org/10.1063/1.5012272; Feb. 12, 2018; 12 pages.

Basar, Md Rubel et al., Application of Wireless Power Transmission Systems in Wireless Capsule Endoscopy: An Overview; Sensors 2014, 14, 10929-10951; doi:10.3390/s140610929.

Brecher, Aviva, Dr. et al., "Review and Evaluation of Wireless Power Transfer (WPT) for Electric Transit Applications" P.E. FTA Report No. 0060 Federal Transit Administration, U. S. Department of Transportation Volpe National Transportation Systems Center Aug. 2014; 61 pages.

Kesler, Morris, Dr., Witricity White Paper: "Highly Resonant Wire-less Power Transfer: Safe, Efficient, and over Distance" White_Paper_20161218; 13 pages.

Huang, Da et al., "Magnetic superlens-enhanced inductive coupling for wireless power transfer", J. Appl. Phys. 111, 064902 (2012); http://dx.doi.org/10.1063/1.3692757; 9 pages.

Whitley, Darrell, "A Genetic Algorithm Tutorial", Statistics and Computing vol. 4, pp. 65-85 (1994).

Schaecher, Stephan et al. "Resonant wireless power transfer", White Paper May 2018 (www.infineon.com/wirelesscharging); 12 pages.

International Search Report issued on related International Patent Application No. PCT/CA2021/050127; mailed Apr. 9, 2021; 11 pages.

* cited by examiner

600

650

| Name | X | Y |
|------|---------|---------|
| m1 | 45.0000 | 36.6641 |
| m2 | 45.0000 | 29.6286 |
| m3 | 45.0000 | 23.2859 |
| m4 | 45.0000 | 17.8667 |
| m5 | 45.0000 | 13.3815 |
| m6 | 45.0000 | 9.9052 |
| m7 | -45.0000 | 7.6567 |
| m8 | -45.0000 | 6.2204 |
| m9 | -45.0000 | 4.8717 |
| m10 | -45.0000 | 3.7084 |
| m11 | -45.0000 | 2.7034 |
| m12 | -45.0000 | 2.0770 |

| Name | X | Y |
|------|---------|---------|
| m1 | 50.0000 | 53.5347 |
| m2 | 50.0000 | 47.2102 |
| m3 | 50.0000 | 41.0256 |
| m4 | 50.0000 | 34.8915 |
| m5 | 50.0000 | 28.9623 |
| m6 | 50.0000 | 23.6850 |
| m7 | -45.0000 | 0.0027 |

2-way differential coupler
power splitter

N-way differential coupler
power splitter 2-way differential modified
Wilkinson power splitter N-way differential modified Wilkinson
power splitter 2-way differential power splitter,
comprising a ferrite core transformer (1:1 or 1:n turns)

N-way differential power splitter,
comprising a ferrite core transformer (1:1 or 1:n turns)

APPARATUS, SYSTEMS AND METHODS FOR SCALABLE 3D WIRELESS CHARGING UTILIZING MULTIPLE COILS

CROSS-REFERENCE TO RELATED APPLICATIONS

This application claims priority from U.S. provisional patent application No. 63/143,995 filed Feb. 1, 2021, entitled "Apparatus, Systems and Methods for Scalable 3D Wireless Charging Utilizing Multiple Coils", which is incorporated herein by reference in its entirety.

This application is related to U.S. patent application Ser. No. 17/094,061 filed Nov. 10, 2020, entitled "High Efficiency Resonator Coils for Large Gap Wireless Power Transfer Systems", which claims the benefit of U.S. provisional patent application No. 62/947,144, filed Dec. 12, 2019, of the same title; and is related to PCT International application no. PCTCA2021/050127 filed Feb. 5, 2021, entitled "Apparatus, Systems and Methods for Load-Adaptive 3D Wireless Charging", which claims priority from U.S. provisional patent application No. 62/977,783, filed Feb. 18, 2020, of the same title. All these applications are incorporated by reference in their entirety.

TECHNICAL FIELD

Inventions disclosed herein relate to wireless power transfer (WPT), e.g. systems, and methods and apparatus to accomplish WPT, and more particularly relate to a scalable three-dimensional (3D) wireless charging system of mobile devices based on resonant inductive power transfer using multiple coils.

BACKGROUND

Electromagnetic resonance power transfer, which may be referred to as resonant inductive wireless power transfer (WPT) or resonant inductive wireless energy transfer, works by creating a wireless transfer of electrical energy between two coils, tuned to resonate at the same frequency. Based on the principles of electromagnetic coupling, resonant-based power sources inject an oscillating current into a highly resonant coil to create an oscillating electromagnetic field. A second coil with the same resonant frequency receives power from the electromagnetic field and converts it back into an electrical current that can be used to power and charge devices.

For example, Standard IEC 63028:2017(E) defines technical requirements, behaviors and interfaces used for ensuring interoperability for flexibly coupled WPT systems for the AirFuel Alliance Resonant WPT. Resonant inductive energy transfer enables transmission of energy over longer distances than non-resonant inductive charging (see Table 1 below). For example, Wireless Power Consortium (WPC), formerly Qi, relates to (non-resonant) inductive WPT, which has a limited range, e.g. a few mm. AirFuel Alliance was formerly PMA, AW4P and Rezence. AirFuel resonant inductive WPT has a larger range, e.g. a maximum range of 50 mm. For example, AirFuel compliant resonant inductive WPT allows for a gap of up to 50 mm between the transmitter (Tx) coil and receiver (Rx) coil, and provides for charging of multiple devices.

TABLE 1

| Standard Organization | Wireless Power Consortium (Qi) | AirFuel Alliance (Rezence) |
| --- | --- | --- |
| Method | Inductive | Resonant |
| Frequency Range | 80 kHz to 300 kHz | 6.78 MHz |
| Maximum transfer range | 5 mm | 50 mm |
| Number of charging devices | One | One and Multiple |
| Communications system | Load modulation | Bluetooth |

At present, commercially available technology for wireless charging of small mobile communication devices, e.g. smartphones, tablets, watches, and other wearable devices, is typically based on a charging unit comprising a planar charging surface, e.g. a pad or a tray. The charging pad contains a power source and a transmitter coil, and the mobile device contains a receiver coil. For inductive WPT, the mobile device is placed directly on the charging pad for charging, so it may be difficult or inconvenient to make use of the mobile device during charging.

Charging stations are now being developed for 3D wireless charging of mobile devices. 3D wireless charging offers more spatial freedom and a larger gap between the charging station and the mobile device, potentially enabling a user to continue using a mobile device while it is charging. However, 3D charging of multiple devices adds significant design complexity: for example, there are design challenges relating to providing coil designs for generating 3D magnetic fields over a required charging space (i.e. volume or region); detection of the placement (or removal) and positioning (orientation) of one or more devices at a charging station; and load-dependent impedance detection and impedance matching to maintain efficient operation of the power amplifier of the transmitter.

To achieve optimum system efficiency, the effective load seen by the PA, i.e. input impedance $Z_{in}$, is tuned to a range in which the PA operates at highest efficiency, e.g. as described in the above-referenced related U.S. patent application Ser. No. 17/094,061. For example, a switch mode class EF2 power amplifier (PA) offers high efficiency, EMI performance and compact topology (see article entitled "High Power Constant Current Class EF2 GaN Power Amplifier for AirFuel Magnetic Resonance Wireless Power Transfer Systems", by Tiefeng Shi and Paul Wiener, PCIM, 5-7 Jun. 2018).

For low power applications of WPT, in which the variation of input impedance is small, many systems work without tuning or use a simple auto-tuning system. For higher power applications, or more complex WPT systems, such as 3D charging, where there may be large variations of input impedance, a load dependent auto-tuning system is needed for system reliability and efficiency. For 3D charging applications of multiple devices, the input impedance may vary significantly, and may vary over a wider range of impedance, e.g. dependent on the number of devices and the positioning of devices placed at a charging station. Thus 3D charging systems require some form of impedance detection and impedance tuning for system reliability: e.g. to limit over-current or over-voltage conditions and thermal overload of the PA, which may arise from a load which is too inductive or too capacitive, and to maintain a safe operating temperature, i.e. to operate the charging station in a high efficiency range to limit unwanted thermal dissipation.

Conventional 3D charging systems that utilize multiple Tx coils have the Tx coils orthogonal or perpendicular to each other to generate a magnetic field and generally have one power source (e.g. power amplifier) for each Tx coil. In other conventional 3D charging systems utilizing multiple Tx coils, a single power amplifier with a switching structure is used. Challenges with 3D charging systems that have multiple coils include interference between coils, where the interference may cause power dissipation, low system efficiency, and problems associated with how to distribute power between multiple coils. Another issue with such systems is backward current from another power source that could make system uncontrolled, (e.g. matching network matches to a wrong impedance point). Low efficiency of the PA may result in high dissipation of power, which will be converted to heat. This may impact charging system reliability and could damage the PA particularly in high power applications.

There is a need for improved or alternative apparatus, systems, and methods for 3D wireless charging, which address at least one of the above-mentioned issues.

SUMMARY OF THE INVENTION

As wireless power transfer (WPT) applications are expanding, there is a need and desire when charging mobile devices (e.g. smartphones, tablets) for more spatial freedom and a bigger gap between a charging station and the mobile devices.

In the present application there is provided a 3D WPT charging system that may charge multiple mobile devices. To maintain a larger charging gap and bigger charging area of the system and for the system to operate in the best efficiency impedance range, the system of the present application utilizes multiple coils to optimize the charging efficiency and charging area coverage. The 3D charging area (may also be referred to as magnetic field) is the space around the coil topology (e.g. coil arrangement or coil structure). The 3D shape of the coil topology will influence the shape and dimensions of the charging space. Although the system of the present application may follow the Airfuel standard, in example embodiments the charging gap of the present system is greater than the gap specified in the current Airfuel standard.

A system with multiple coils driven by multiple power amplifiers may have challenges regarding internal coils coupling, which will impact the charging system efficiency. For example, power from one power amplifier may go to another power amplifier instead of transmitting power to a power receiving unit (e.g. mobile devices). There are many challenges with driving multiple coils with a single power source.

The WPT system of the present application efficiently drives multiple resonator coils utilizing one power amplifier. In an example embodiment, the WPT system of the present application comprises a power amplifier, a differential 1:N power divider, impedance inversion circuits and multiple resonator coils. In some embodiments, the WPT system may further include auto-tuning circuits with sensors that also facilitate the efficient driving of the multiple resonator coils.

As well, the present application provides various 3D coil topology designs that are comprised of two separate coils. The 3D coil topology designs of the present application each provide a specified 3D magnetic field for wireless charging.

There is provided a 3D resonant wireless power transfer (WPT) transmitter device comprising a power amplifier, two or more coils, and a power divider for dividing the power to each of the two or more coils, where the power source drives the two or more coils to generate a 3D magnetic field for wirelessly charging mobile devices. The power divider may be a 1:N differential power divider.

In example embodiments, the 1:2 or 1:N differential power divider may be a differential coupler power divider, a Wilkinson power divider, a modified Wilkinson power divider, or a ferrite core transformer power divider.

The WPT transmitter device may further comprise a matching circuit for converting a power output from the power amplifier into a constant voltage source. The WPT transmitter device may further comprise an impedance inversion circuit for each of the two or more coils for converting the constant voltage source into a constant current. The WPT transmitter device may further comprise an auto-tuning circuit for each coil of the two or more coils for tuning the coil to resonant at the same frequency as a receiving coil.

There is provided a 3D shaped transmitter resonator coil topology (may also be referred to as coil arrangement or coil structure) for generating a 3D magnetic field distribution in a resonant wireless power transfer (WPT) system, the 3D coil comprising a first coil; and a second coil; where the first coil and the second coil are positioned relative to each other to form a 3D shape. There is a gap between the first coil and the second coil. In some embodiments, the first coil and the second coil are parallel to each other.

In an embodiment, each of the first coil and the second coil are curved and are positioned to form a cylindrical coil arrangement. In another embodiment each of the first coil and the second coil are L-shaped and are positioned to form a cubic coil arrangement Another aspect provides a resonant wireless power transfer (WPT) system, the WPT system comprising: a 3D coil topology comprising two or more coils for generating a 3D magnetic field over a charging area; a power amplifier; and a differential power divider for dividing power from the power amplifier to each of the two or more coils; wherein each of the two or more coils have a feed point, and the feed points of the two or more coils are positioned so that a current feed to each coil is in-phase or near in-phase, to improve efficiency.

The foregoing and other features, aspects and advantages will become more apparent from the following detailed description, taken in conjunction with the accompanying drawings, of example embodiments, which description is by way of example only.

The foregoing and other features, aspects and advantages will become more apparent from the following detailed description, taken in conjunction with the accompanying drawings, of example embodiments, which description is by way of example only.

DETAILED DESCRIPTION

Figure 1:
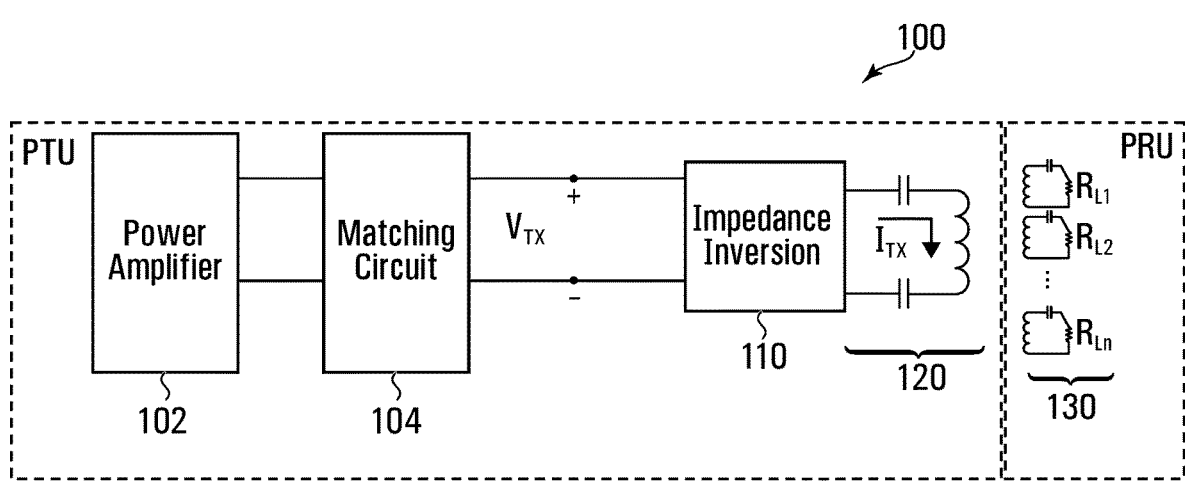
FIG. 1 illustrates a block diagram of a WPT system having one power amplifier driving one coil in accordance with an example embodiment of the present application.

A resonant inductive wireless power transfer (WPT) system is shown schematically in FIG. 1, according to an example embodiment of an architecture with one power amplifier driving one resonant coil. In the WPT system 100, the source or transmitter (Tx), which may be referred to as the Power Transmitting Unit (PTU), comprises an RF source in the form of a power amplifier (PA) 102, a matching circuit 104, an impedance inversion circuit 110 and a Tx resonator coil 120 (may also be referred to as coils or resonators). As shown in FIG. 1, capacitors are included in the circuit between the impedance inversion circuit 110 and the Tx coil 120. The PA 102 drives the WPT system 100 and is modeled as an ideal constant current source. The receiver, or Power Receiving Unit (PRU), comprises a Rx resonator coil 130. The PRU may further include an impedance matching circuit, and a rectifier, e.g. a diode bridge (not shown).

In the WPT system 100 having the PA 102 driving the one Tx coil 120, the matching network is split into two halves, having a differential configuration. Half of it, the matching circuit 104 following the PA 102, is responsible for converting the power output of PA 102 into a constant voltage source with AC voltage of VTx. While the other half of the matching network, the impedance inversion circuit 110 provides, in an example embodiment, a 90 degree phase shift and impedance transformation that converts the constant AC voltage (VTx) into a constant current ITx output to the tuned resonator coil 120 that follows.

Figure 2:
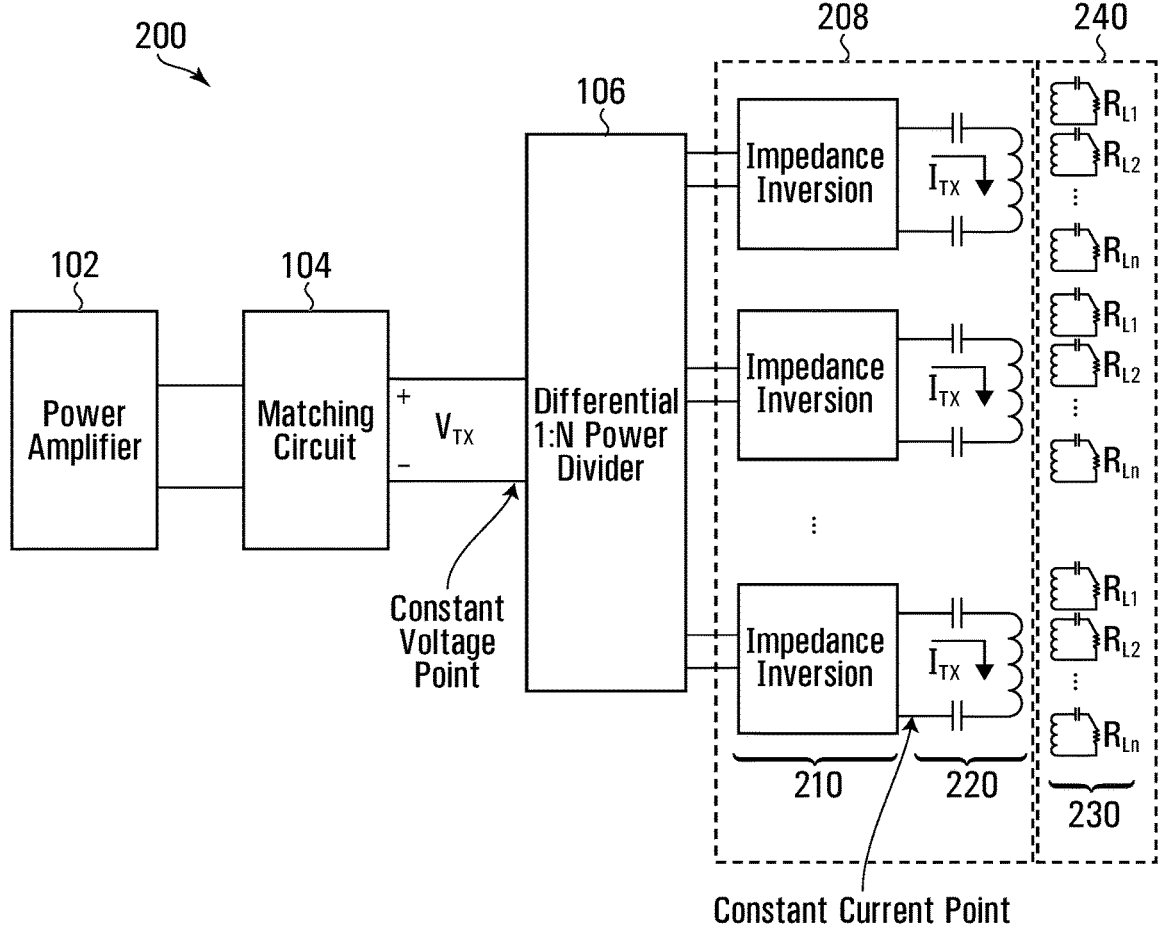
FIG. 2 illustrates a block diagram of a WPT system having one power amplifier driving multiple coils in accordance with an example embodiment of the present application.

As shown schematically in FIG. 2, there is provided a WPT system 200 having a single PA driving multiple coils, in accordance with an example embodiment of the present application. The WPT system 200 provides a constant voltage design point in the system and maintains compliance with the AirFuel standard by providing constant current at each Tx resonator with separated coils. The WPT system 200 includes a PA 102, a matching circuit 104, a differential 1:N power divider 206 and a resonator module 208. The resonator module 208 includes impedance inversion circuits 210, Tx resonator coils 220. The power receiving units 240 comprise Rx resonator coils 230. The WPT system 200 is scalable to allow the use of multiple Tx resonator coils 220 to provide multiple active 3D charging areas. The multiple Tx resonator coils 220 are driven by the single PA 102. The differential 1:N power divider 206 provides isolation for each Tx coil thereby avoiding interference occurring between the multiple Tx resonator coils 220. Other configurations of differential power dividers may be used in the system 200.

With the proposed WPT system 200 topology shown in FIG. 2, when more active mobile devices (e.g. smartphones, tablets) are placed around the 3D charging areas, multiple coil modules operate in-phase and in combination, with each of the Tx coil resonators establishing an active charging area that can support multiple mobile devices with different power profiles per the current AirFuel standard. The load is converted by the resonator and impedance inversion circuit to each terminal of the power distribution network (power divider) at the constant voltage point VTx, and power pulled from the PA circuit will naturally increase to charge the introduced PRU device. Same impedance inversion circuits can be used to convert the constant voltage provided by PA to constant current on each of the Tx coil/resonator(s).

The Tx coil resonators may each be a 3D coil, or an arrangement of multiple individual coils that when positioned form a 3D shaped coil, or a combination of both. For example, a first Tx coil resonator may be a 3D T-shaped coil (e.g. FIG. 10A, FIG. 10B), and a second and third Tx coils may combine to form a 3D shape (e.g. FIG. 7A, FIG. 7B).

For AirFuel infrastructure deployment, having the PA driving multiple coil/resonators as a current source in series is not practical for 3D charging for bigger charging areas. Airfuel targets a gap between a flat charging pad and charging device where the gap is 5 mm to 50 mm over the flat charging pad. Airfuel focusses on even charging distribution and does not address a flexible 3D charging space.

The solution of the present application provides one PA driving multiple coils of AirFuel architecture where a distributing network is provided between the PA and multiple Tx coils/resonators that facilitates a common interface with a constant voltage (VTx) point, which allows power distribution to multiple coils with isolation and in-phase through PA and coils/resonator modules while maintaining system efficiency without interference between coils.

Figure 3A:
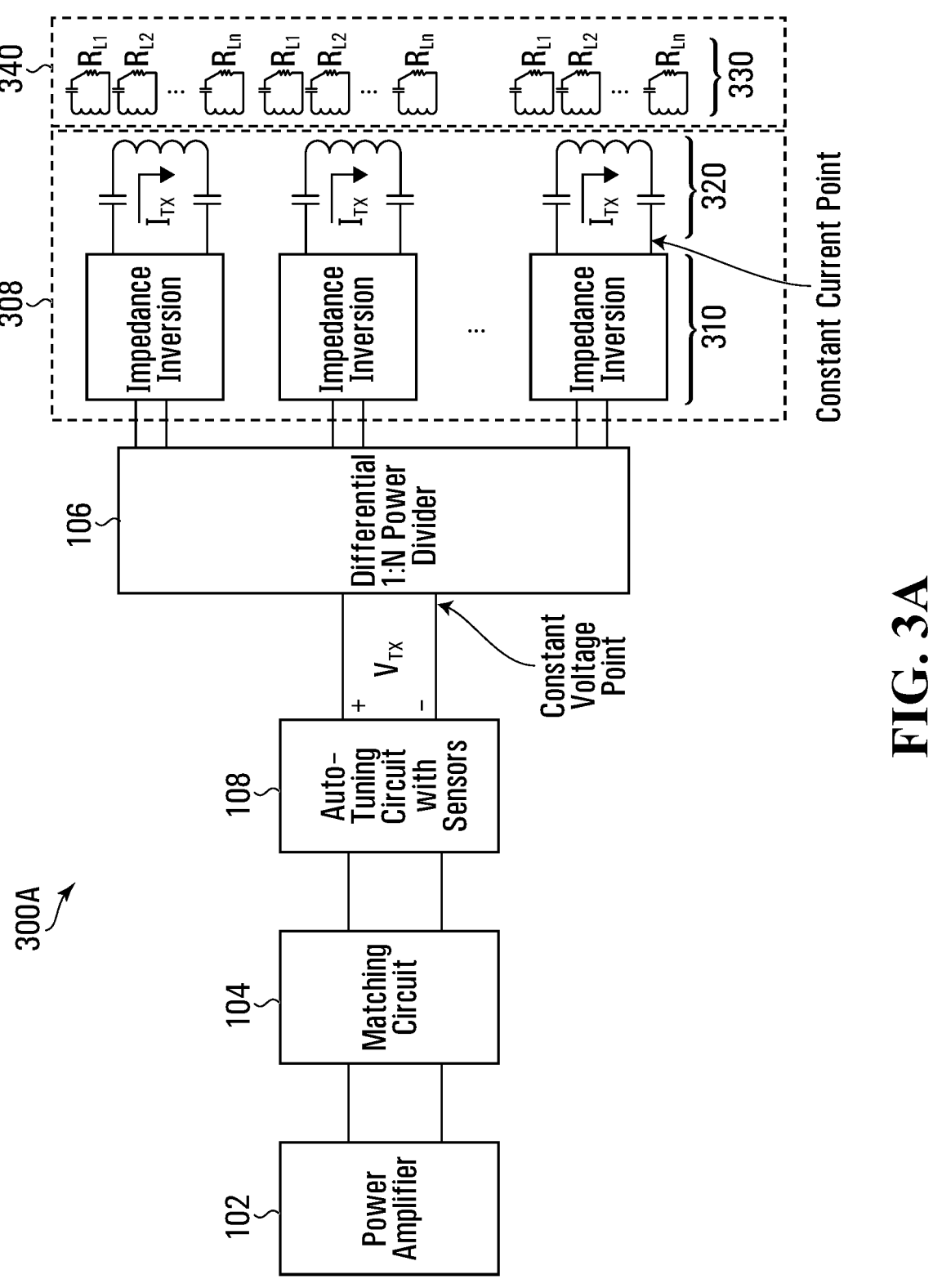
FIG. 3A illustrates a block diagram of a WPT system having one power amplifier driving multiple coils with an auto-tuning circuit in accordance with an example embodiment of the present application.
Figure 3B:
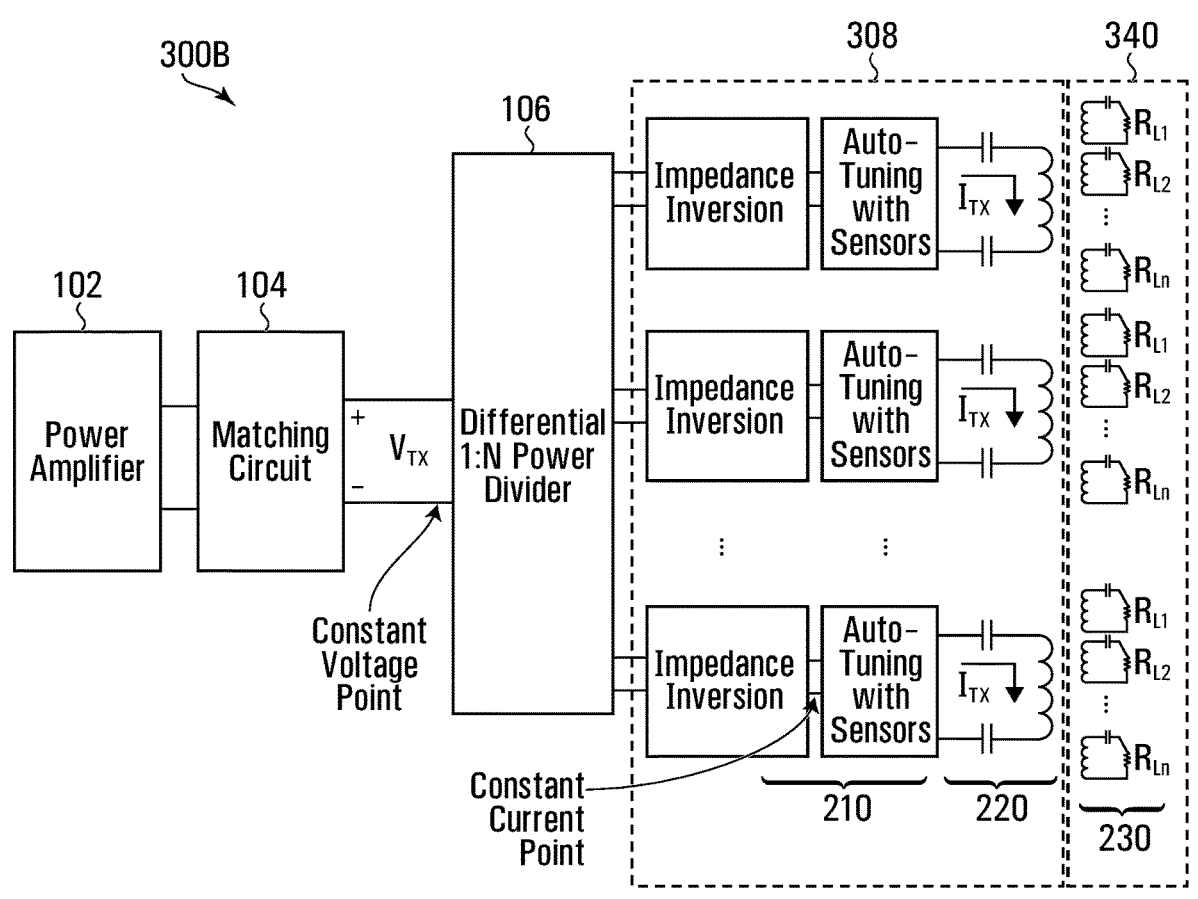
FIG. 3B illustrates a block diagram of a WPT system having one power amplifier driving multiple coils with an auto-tuning system in accordance with an example embodiment of the present application.
Figure 5:
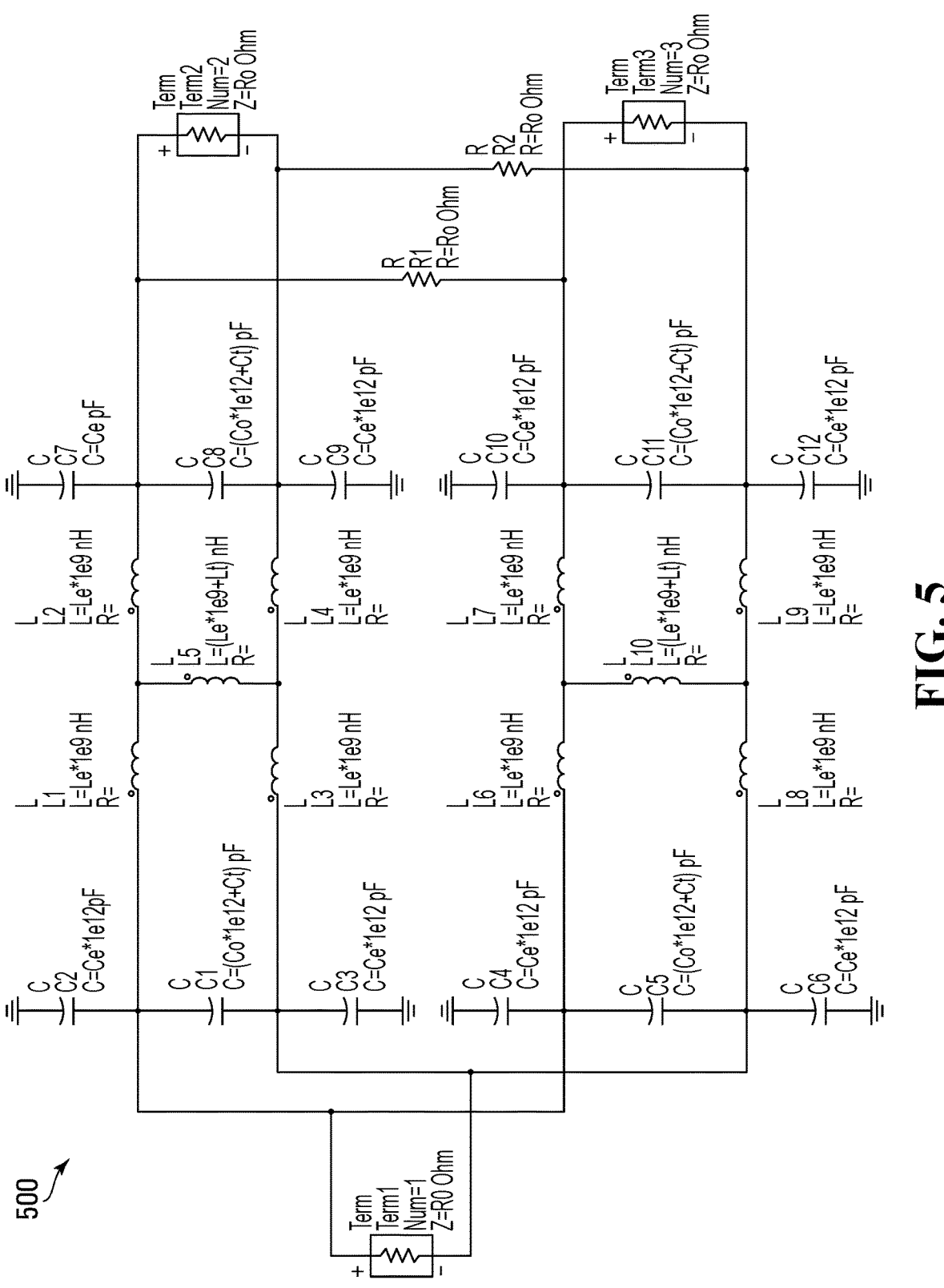
FIG. 5 illustrates a circuit diagram of 1 to 2 differential power divider for use in a WPT system in accordance with an example embodiment of the present application.

The differential power divider 106 shown schematically in FIGS. 2, 3A and 3B of the present application may include different designs and configurations depending on various factors, such as for example charging requirements, number of resonator coils, impedance range and power levels, etc. FIG. 5 illustrates a circuit diagram 500 of a 1:2 differential power divider design for a 3D charging system having one PA driving two Tx resonator coils, in accordance with an example embodiment of the present application.

In the example circuit 500, the calculation of each element may be written as:

$$C_e = \frac{Y_{oe}}{\omega}\tan\left(\frac{\theta}{2}\right) \qquad (1)$$

$$L_e = \frac{1}{2}\frac{Z_{oe}}{\omega}\sin\left(\frac{\theta}{2}\right) \qquad (2)$$

$$C_o = \left(-\frac{Y_{oe}}{\omega}\cot\left(\frac{\theta}{2}\right)+\frac{1}{\omega^2 L_e}-C_e\right)\Big/2 \qquad (3)$$

$$L_o = \left(\frac{1}{\omega^2(C_e+2C_o)-\omega Y_{oo}\tan\left(\frac{\theta}{2}\right)}-L_e\right) \qquad (4)$$

where the ω is a frequency parameter omega; $C_o$, $C_e$ are odd and even mode capacitance; $L_o$, $L_e$ are odd and even mode inductances. θ is phase; θ is 90 degree@ 6.78 Mhz. $Z_{oo}$, $Z_{oe}$ are even and odd mode impedances, $1.414*Z_o$ and $Z_o/1.414$ respectively. $Z_o$ is a normalization impedance, which in this example is 30Ω, which is also an optimized operation load impedance of the PA.

For the 1:2 differential power divider in the example circuit 500, example values for each element according to an example embodiment are:

$C_e$=714 pF
$C_o$=1384 pF
$L_e$=135 nH
$L_o$=84.2 nH
$Z_o$=30 ohm

With the example values of each component above, fine tuning adjustments of $C_o$ and $L_o$ may be performed for improved isolation performance between two coils.

Figure 16A:
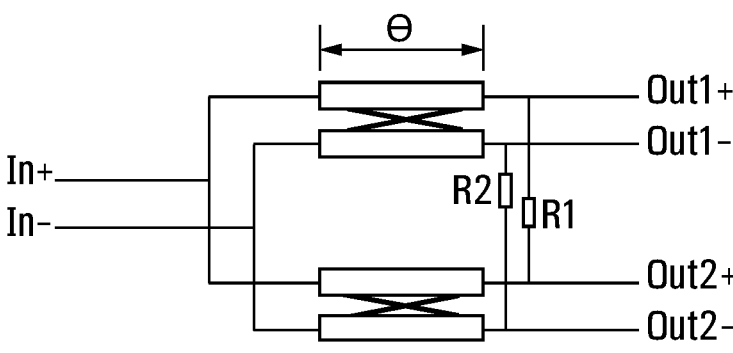
FIG. 16A illustrates a block diagram of a 2-way differential power splitter in accordance with an example embodiment of the present application.
Figure 16B:
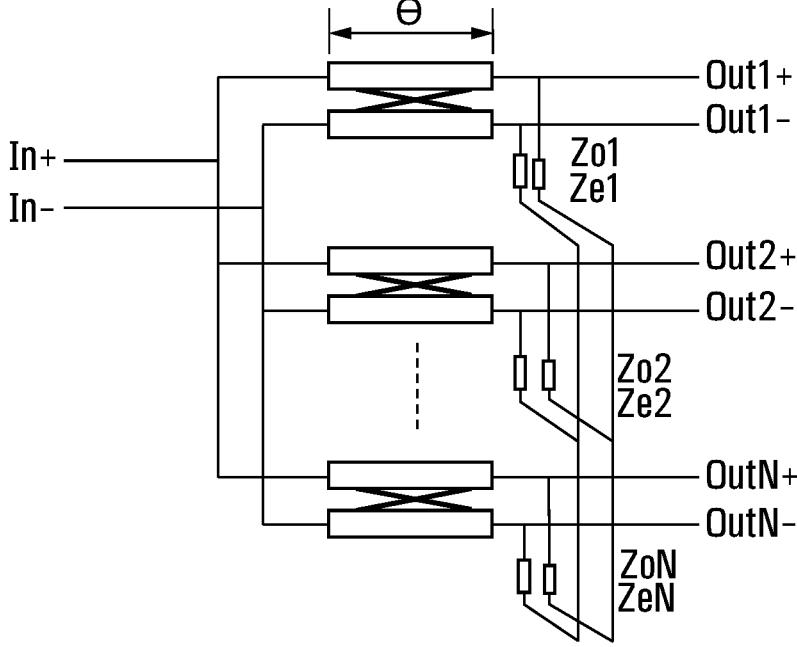
FIG. 16B illustrates a block diagram of a N-way differential power splitter in accordance with an example embodiment of the present application.

Other power divider circuit designs may be used. For example, FIG. 16A illustrates schematically an example 2-way differential coupler power splitter. This type of differential power splitter provides outputs that are out-of-phase, e.g. a phase difference or phase delay θ of 90° or 180°. FIG. 16B illustrates schematically an example N-way differential coupler power splitter.

Figure 17A:
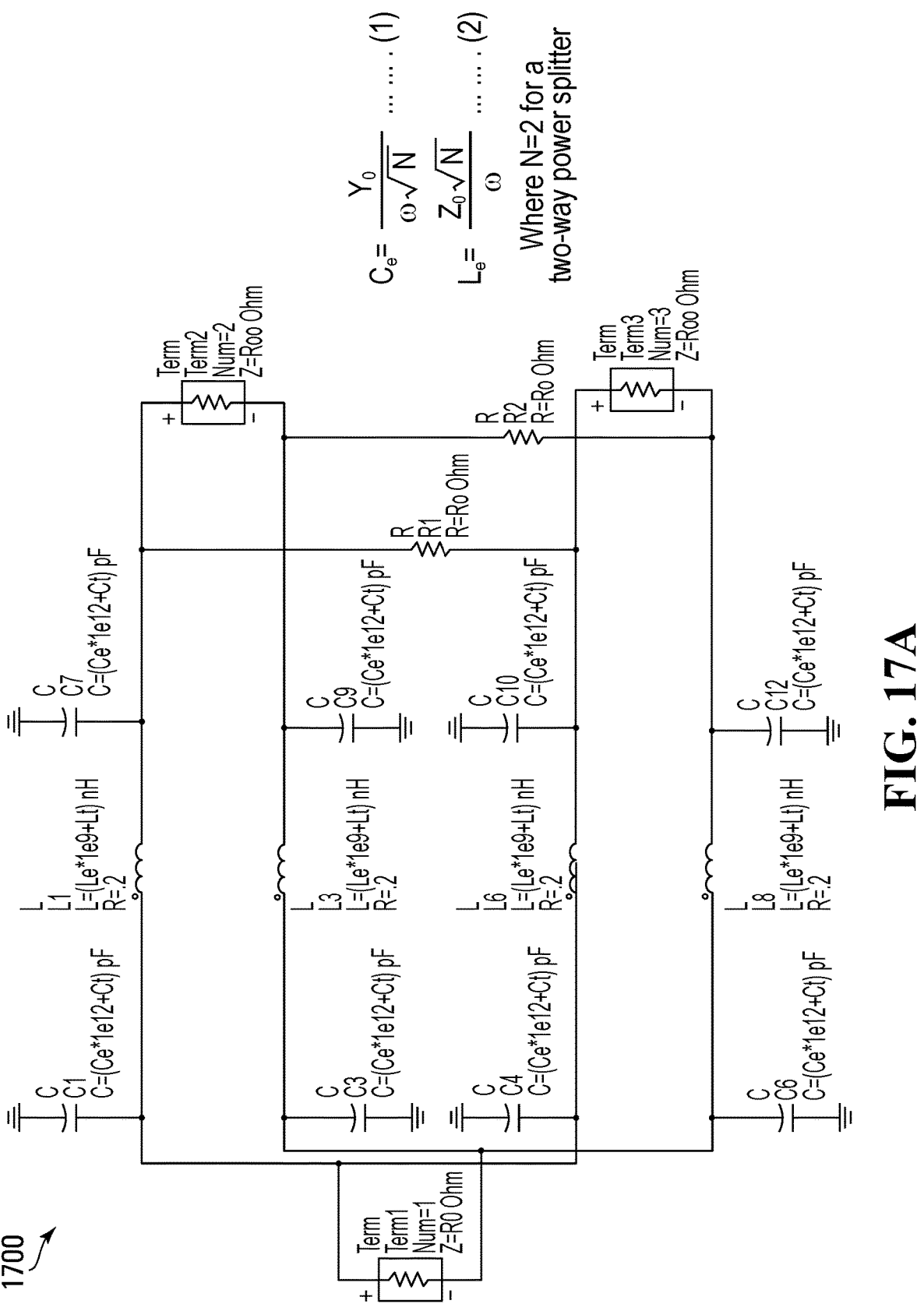
FIG. 17A illustrates a circuit diagram of 2-way differential Wilkinson power splitter for use in a WPT system in accordance with an example embodiment of the present application.

In other example embodiments, there is provided a differential Wilkinson power splitter. FIG. 17A illustrates an example circuit diagram 1700 of a 1 to 2 differential Wilkinson power splitter for use in the WPT system, where values of Ce and Le are defined by:

$$C_e = \frac{Y_o}{\omega\sqrt{N}} \text{ and } L_e = \frac{Z_o\sqrt{N}}{\omega}$$

where N=2 for a two-way power splitter.

Figure 17B:
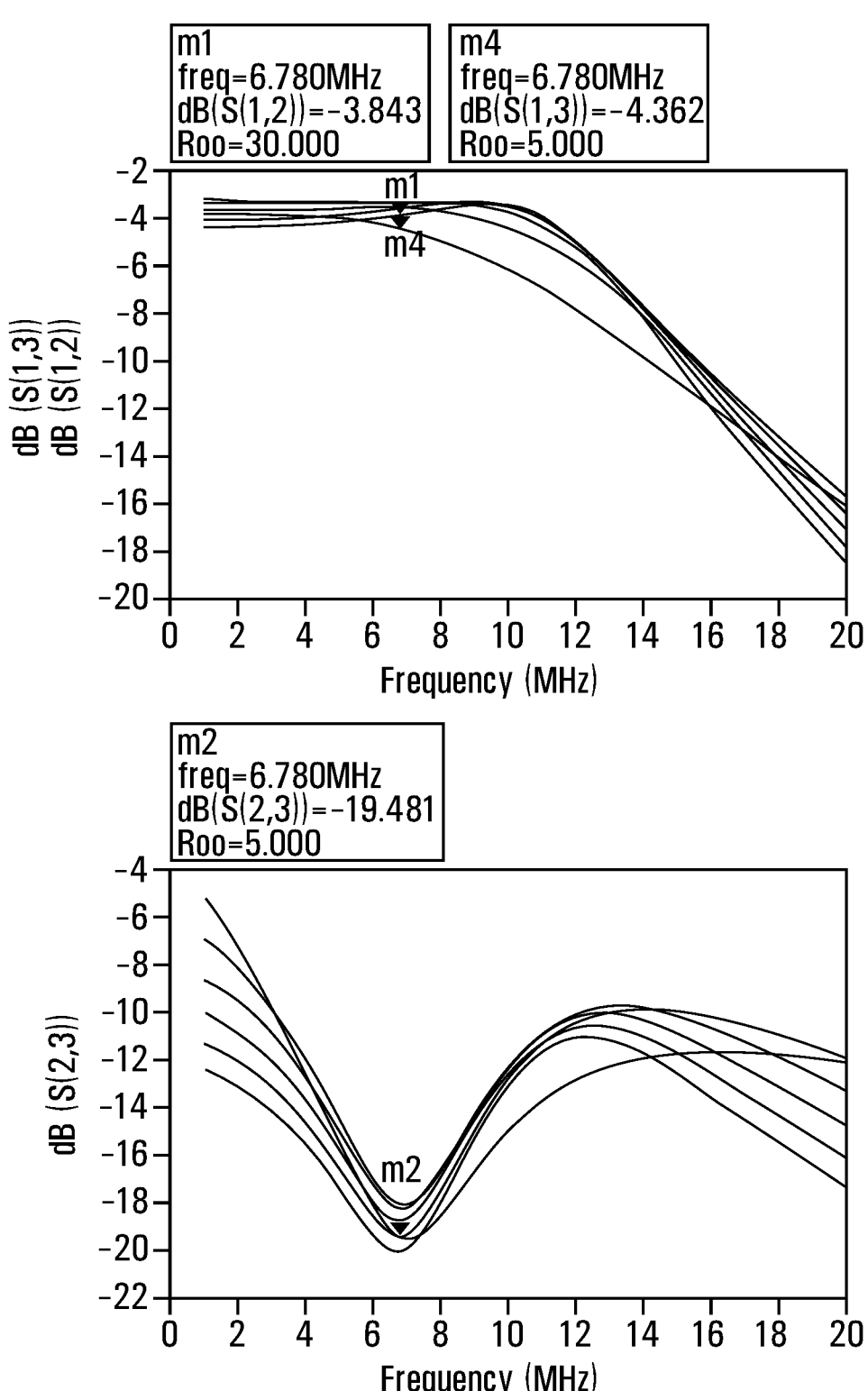
FIG. 17B illustrates isolation and insertion loss graphs for the 2-way differential Wilkinson power splitter shown in FIG. 17A, in accordance with an example embodiment of the present application.

FIG. 17B illustrates isolation and insertion loss graphs at the specified 3-port S-parameters (S(1,3); S(1,2) and S(2,3)) for the 2-way differential Wilkinson power splitter shown in FIG. 17A. Data curves are shown for output impedances Roo in the range of 5Ω to 30Ω.

Figure 18A:
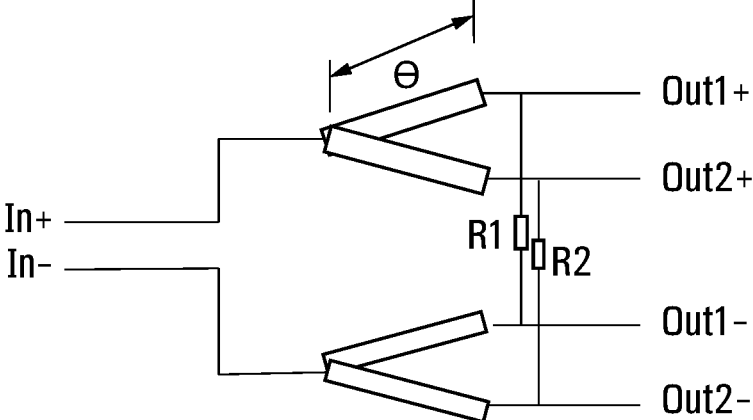
FIG. 18A illustrates a block diagram of a 2-way differential modified Wilkinson power splitter in accordance with an example embodiment of the present application.
Figure 18B:
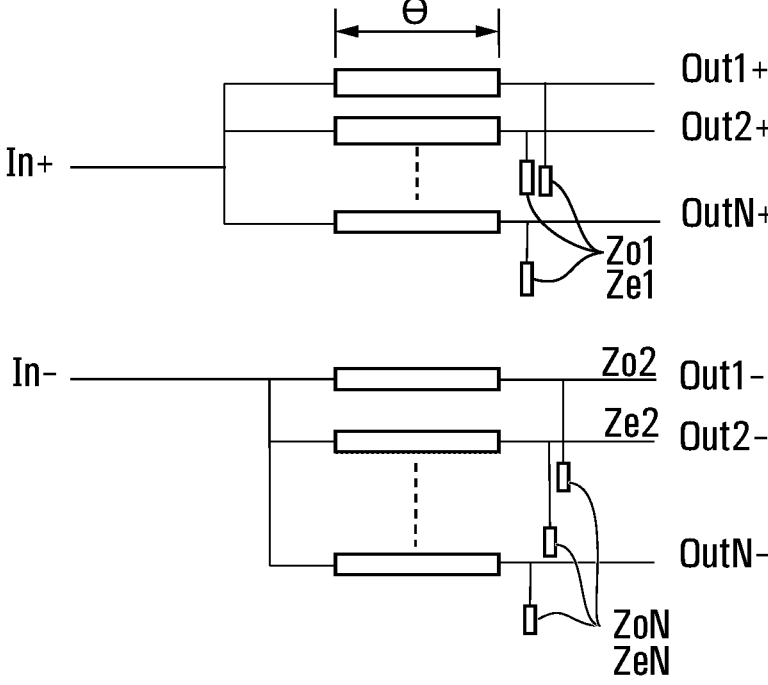
FIG. 18B illustrates a block diagram of a N-way differential modified Wilkinson power splitter in accordance with an example embodiment of the present application.

FIG. 18A illustrates a lumped element block diagram of a 2-way differential modified Wilkinson power splitter with isolation resistors R1 and R2. The two outputs have the same phase. The 2-way differential modified Wilkinson power splitter shown in FIG. 18A has resistor R1 connected to Out1+ and Out1−, and resistor R2 connected to Out2+ and Out2−. In contrast, a conventional Wilkinson power splitter would have resistor R1 connected to Out1+ and Out2+ and resistor R2 connected to Out1− and Out2−. FIG. 18B illustrates a block diagram of a N-way differential modified Wilkinson power splitter in accordance with an example embodiment of the present application, comprising isolation resistors Zo1, Ze1; Zo2, Ze2; Zon, . . . Zen. Each output has the same phase.

The choice of 1:2 or 1:N differential power divider depends on the number of Tx coils to be driven by the PA. The choice of a type of differential power divider depends on e.g., frequency, load impedances, and power levels, and whether outputs are to be in-phase or out-of-phase.

Figure 19A:
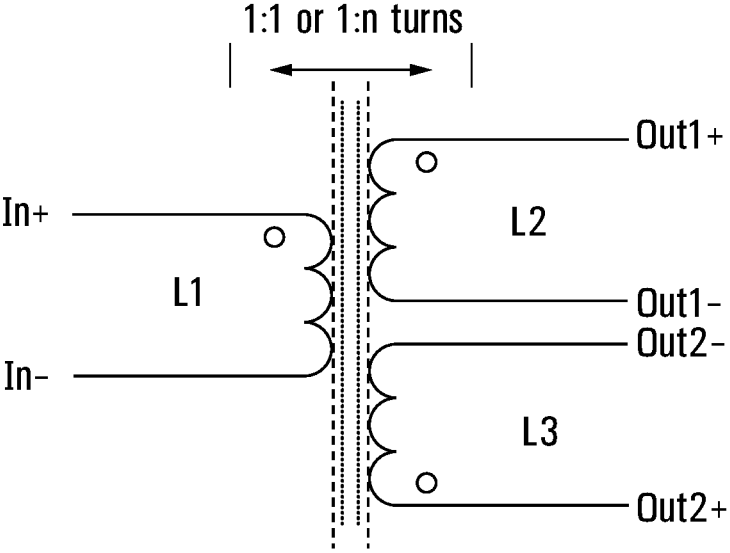
FIG. 19A illustrates schematically a 2-way differential power splitter, comprising a ferrite core transformer, in accordance with an example embodiment of the present application.
Figure 19B:
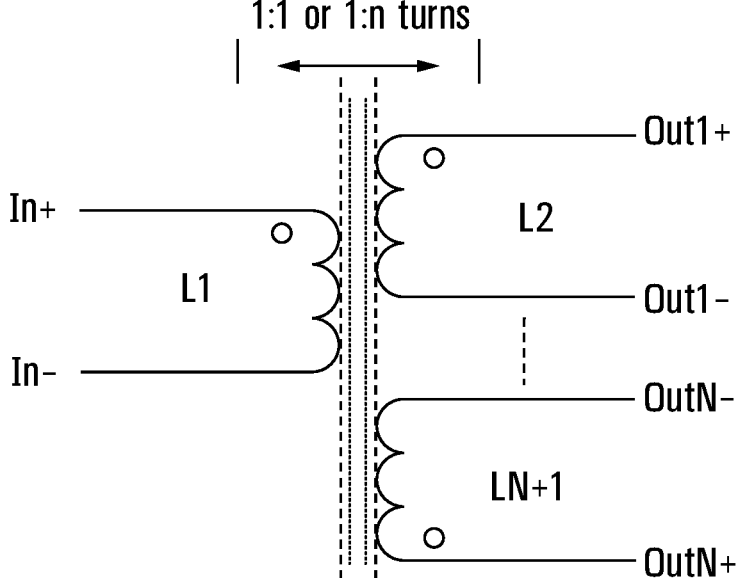
FIG. 19B illustrates schematically a N-way differential power splitter, comprising a ferrite core transformer, in accordance with an example embodiment of the present application.

In other example embodiments, there is provided a 2-way or N-way differential power splitter comprising a ferrite core transformer. FIG. 19A illustrates schematically a 2-way differential power splitter, comprising a ferrite core transformer, in accordance with an example embodiment. The differential ferrite core transformer may comprise windings using a turns ratio of 1:1 or 1:n. For example, the input winding may comprise a single turn around the core, having an inductance L1 and first and second outputs (secondary) windings may each comprise a single turn around the core, having inductances L2, L3, respectively. Example values of these inductances may be e.g. 650 nH±5%. The coil inductances may be selected to be different to provide a required current and voltage. For example, in other embodiments the differential ferrite core transformer uses a different number of turns for one or more windings, e.g. 1 turn for the primary (input) winding) and n turns for the secondary (output) windings, to provide a 1:n turns ratio, e.g. a ratio of 1:5 or 1:7. The power divider may be configured for either step-up or step-down operation. FIG. 19B illustrates schematically a N-way differential power splitter, comprising a ferrite core transformer, in accordance with an example embodiment.

A differential power divider comprising a ferrite core transformer, e.g. as shown in FIGS. 19A and 19B provides better efficiency (lower loss) with higher impedance. It is applicable over a wider range of input impedances, e.g. 2Ω to 100Ω, and is suitable for lower frequencies.

When power receiving unit (PRU) devices (e.g. mobile devices) are presented to the Tx resonator coils in the power transmitting unit (PTU), a metallic chassis or component inside the PRU devices causes the PTU resonator coils to detune and present a load with a large reactive part to the PTU circuit. In current AirFuel compliant designs, a reactance shift detection circuit along with adaptive tuning circuit are usually used to dynamically compensate for reactance shift caused on the PTU resonator, such that it always presents a temporary load to the PA circuitry.

Example auto-tuning circuits with sensors for reactance shift detection are described in the above referenced PCT application no. PCTCA2021/050127.

In some embodiments, an autotuning circuit with sensors for reactance detection is connected between the matching circuit and the inputs of the differential power divider. As shown in FIG. 3A, an example WPT system 300A includes the power amplifier 102, the matching circuit 104, an auto-tuning circuit 108 with sensors for reactance shift detection, the differential 1:N power divider 106 and a resonator module 308. The resonator module 308 includes the impedance inversion circuit 310 and the Tx resonator coils 320. Also shown are Rx resonator coils 330 of power receiving devices 340.

In some embodiments, the scalable architecture of the present application provides the implementation of reactance shift detection and adaptive tuning on each individual PTU module such that the proper power and current distribution among PTU modules can be maintained at the constant voltage (VTx) point. As shown in FIG. 3B, an example WPT system 300B includes the power amplifier 102, the matching circuit 104, the differential 1:N power divider 106 and a resonator module 308. The resonator module 308 includes the impedance inversion circuit 210, the Tx resonator coils 220 and an auto-tuning circuit with sensors 315 positioned between the impedance inversion circuit 210 and the coils 220. Also shown are Rx resonator coils 330 of power receiving devices 340.

Figure 4:
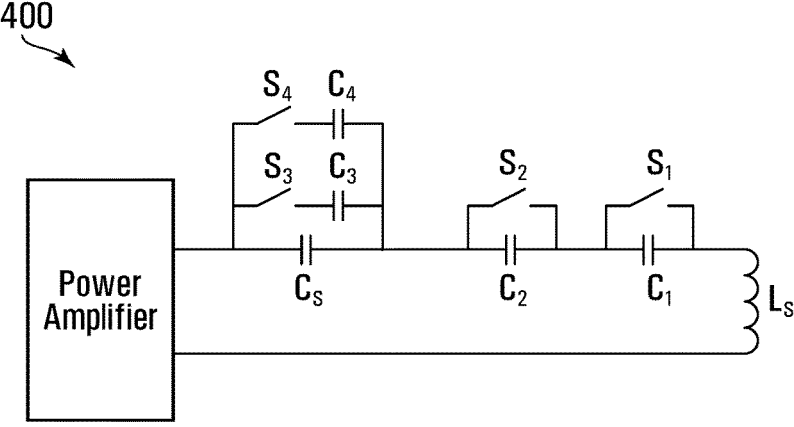
FIG. 4 illustrates a circuit diagram of an auto-tuning system in accordance with an example embodiment of the present application.

FIG. 4 illustrates an example circuit diagram 400 for the auto-tuning with sensors blocks 315 (shown in FIGS. 3A and 3B), in accordance with an example embodiment of the present application. FIG. 4 shows an example implementation of a reactance shift detection and adaptive tuning circuit where the current and voltage at input of the resonator and tuning circuit is measured to determine the reactance shift, while a multitude of tuning components and switches are added to the main tuning capacitor to realize the adaptive tuning functions. The adaptive tuning circuit topology shown in FIG. 4 has four (4) switchable tuning capacitors. The tuning capacitors are in two groups: all capacitors in group one are connected in series and switches ($S_1$, $S_2$) are connected in parallel with the tuning capacitors, which is the fine-tuning group, and all capacitors in group two are connected in parallel and switches ($S_3$, $S_4$) are in series with these tuning capacitors, which is the rough-tuning group. When the coil is exhibiting highest inductance (i.e. open pad condition, all mobile devices are close to coil), all tuning capacitors are connected in series (e.g. switch state $S_1S_2S_3S_4=0011$; S1, S2 for fine-tuning; S3, S4 for rough tuning) to generate the highest tuning reactance. As devices are introduced to the PTU coil, the inductance $L_S$ reduces, and accordingly, the switches are configured to open the combination of rough tuning capacitors, to achieve the maximum impedance coverage with minimum capacitors; and the fine-tuning switches are configured to short-out the combination of series tuning capacitors to achieve a lower reactance to tune the circuit to near resonance; this arrangement provides a uniform smaller step size for impedance optimization efficiency tuning, and reduces the number of capacitors in series configuration, therefore minimizing the capacitor loss the tuning circuit.

Figure 6:
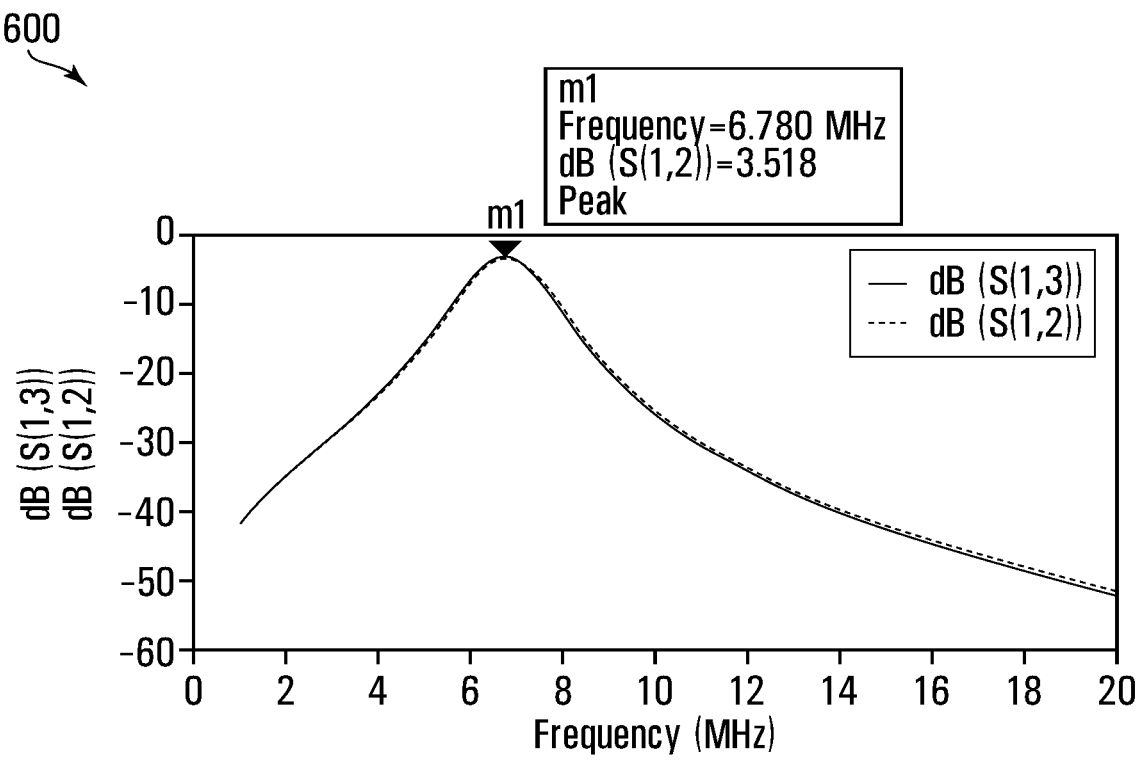
FIG. 6 illustrates frequency response graphs in accordance with an example embodiment of the present application.
Figure 6:
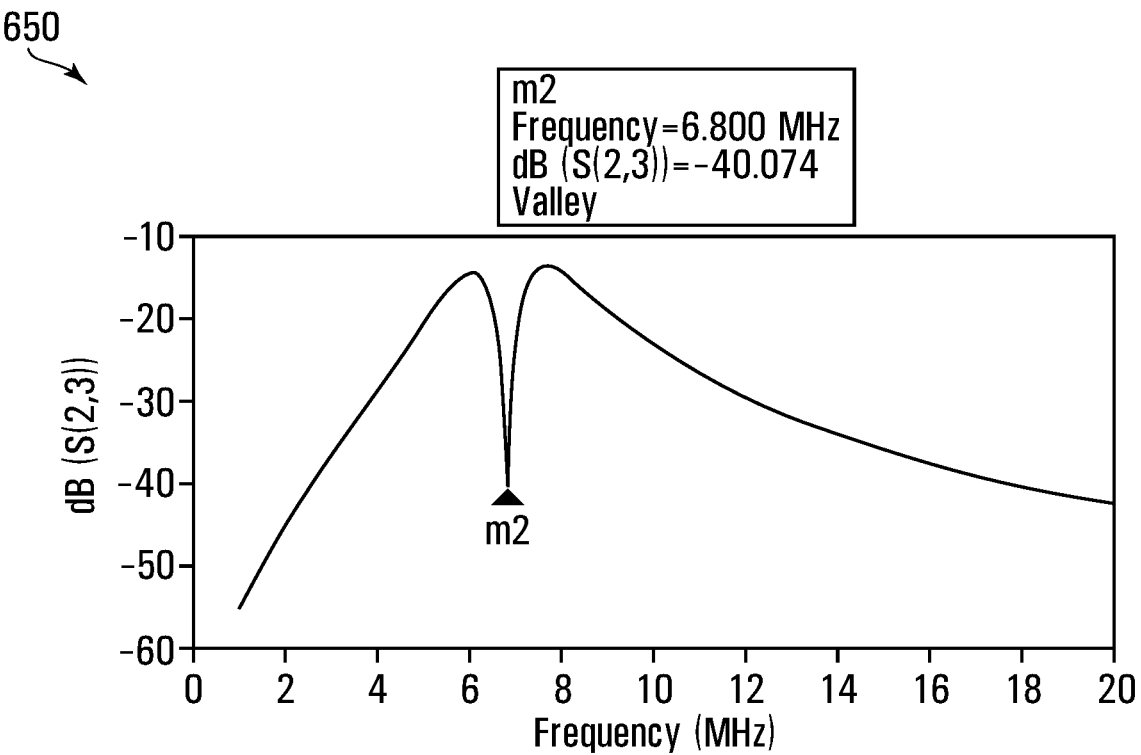

FIG. 6 illustrates simulation frequency response graphs comparing the tuning range of the adaptive tuning circuit 400, according to an example embodiment of the present application. As shown in FIG. 6, the frequency in both graphs 600 and 650 is optimized to approximately 6.8 MHz (e.g. AirFuel standard), and graph 600 illustrates a peak dB point and graph 650 illustrates a valley dB point.

The present application further provides 3D coil designs comprising two separate coils that together form a 3D shape. The 3D coil designs may be utilized as Tx resonator coils (e.g. Tx coils 220) for use in the WPT systems 200 and 300A and 300B of the present application. For example, the combined 3D shape of the two coils may be spherical, hemi-spherical, cylindrical or cubic. The Tx resonator coils may include other 3D shapes including irregular shapes.

The 3D coil topology designs of the present application are designed to create a near uniform magnetic field. The 3D coil topology designs of the present application each generate a specific magnetic field distribution over a 3D charging space. The 3D coils may be positioned on a surface, such as a tabletop or desktop, where the charging space may be a hemi-spherical (half-global) charging space (e.g. charging space truncated by the table surface). In other embodiments, the 3D coils may be suspended or elevated, where the charging space may be spherical in shape. The overall shape and size of the charging area is dependent on for example the shape of the coils in the 3D coil topology, the number of coils used and the placement of the 3D coil topology in the exterior environment. Mobile devices located within the charging area may be charged when still in use, e.g. when a user is holding the device in a typical position and orientation for e.g. texting, web surfing, or replying to email. The solution of the present application allows mobile devices to still be used and held by a user while charging, as compared to conventional solutions which require mobile devices to lay flat on a pad while charging.

The 3D coil topology designs of the Tx resonator coils of the present application may be fabricated using PCB technology. For example, flat planar resonator coils may be fabricated, for example, using conventional PCB technology, e.g. the turns of the coil are formed by conductive copper traces supported on or in a dielectric substrate. Curved resonator coils may be fabricated, for example, using flexible PCB technology (e.g. flex PCB) or PCB substrates that may be formed to a specific shape. In other embodiments, coils may be made of other materials, such as for example, copper foil or copper wires.

Figure 7A:
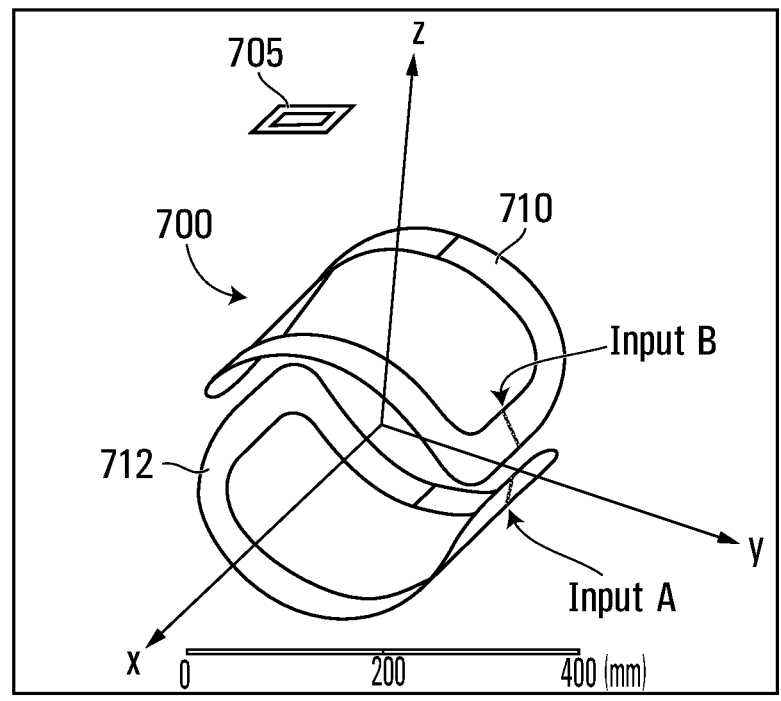
FIGS. 7A and 7B illustrate schematic diagrams of a cylindrical 3D coil topology in accordance with an example embodiment of the present application.
Figure 7B:
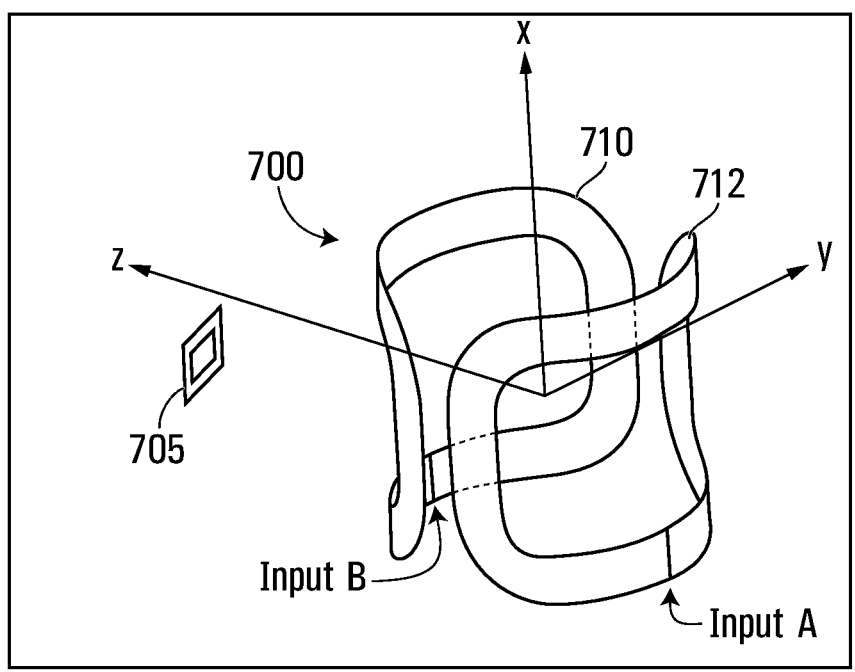

FIGS. 7A and 7B illustrate a cylindrical 3D coil topology in accordance with an example embodiment of the present application. FIG. 7A shows the cylindrical 3D coil topology 700 in a first example orientation and FIG. 7B shows the cylindrical 3D coil topology 700 in a second example orientation. The shape of the 3D cylindrical coil 700 is formed with a first curved coil 710 and a second curved coil 712. The first and second curved coils 710, 712 are positioned relative to each other to create the overall cylindrical shape. In the example embodiment, there is a predetermined gap or space between the first and the second curved coils 710, 712. For example, in some embodiments there is no more than a 10 degree gap between the first and the second curved coils 710, 712 (e.g. the angle calculated from the centre point of the 3D cylindrical coil topology 700). In an example embodiment, a 10 degree gap between the first and second curved coils 710, 712 is a practical gap in the design. Ideally the minimum gap is two times (e.g. 2×) the width of the coil trace width, however such a minimum gap would cause eddy current between the two coils, and reduce the efficiency of the coils.

FIG. 7A shows a first current input location for each of the first curved coil 710 (e.g. input B) and the second curved coil 712 (e.g. input A) and FIG. 7B shows a second current input location for each of the coils 710, 712 (e.g. input B, input A, respectively).

The position of the input locations for each of the coils may affect the efficiency of the coil topology. Computer simulations and testing may be used to analyse what locations of input feeds contribute to the best efficiency for the coil topology. FIGS. 12-15 illustrate the difference and benefits of various input positions.

Figure 12A:
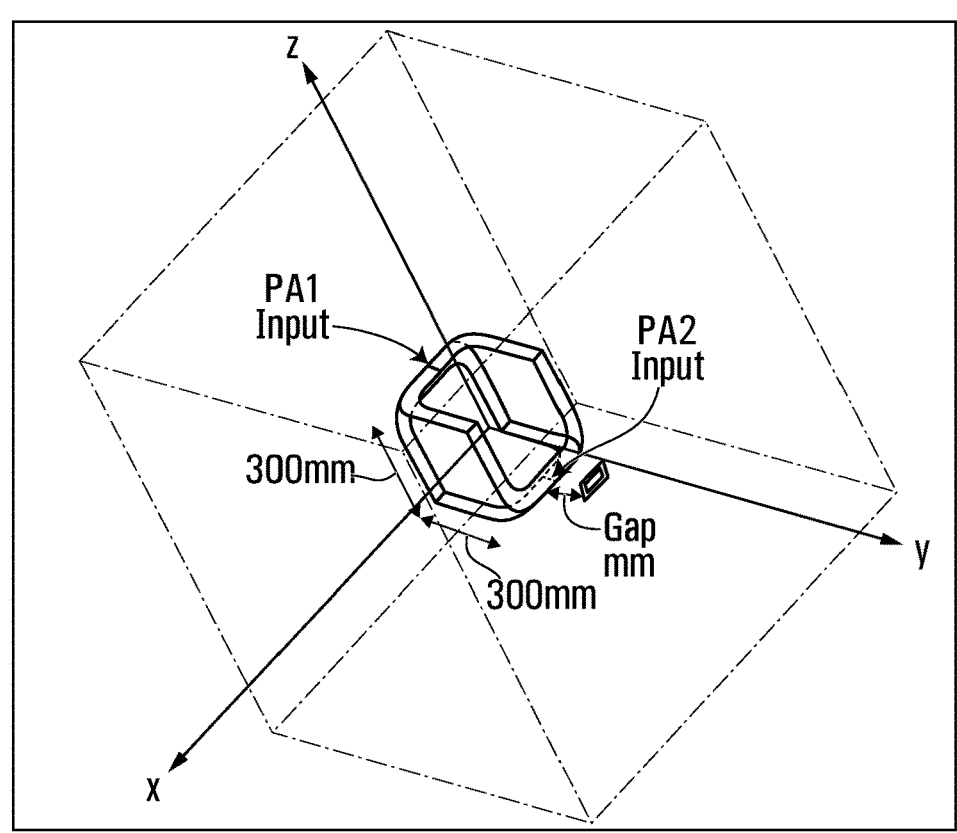
FIGS. 12A and 12B illustrate schematic diagrams of a cubed 3D coil topology with a first input feed position in accordance with an example embodiment of the present application.
Figure 12B:
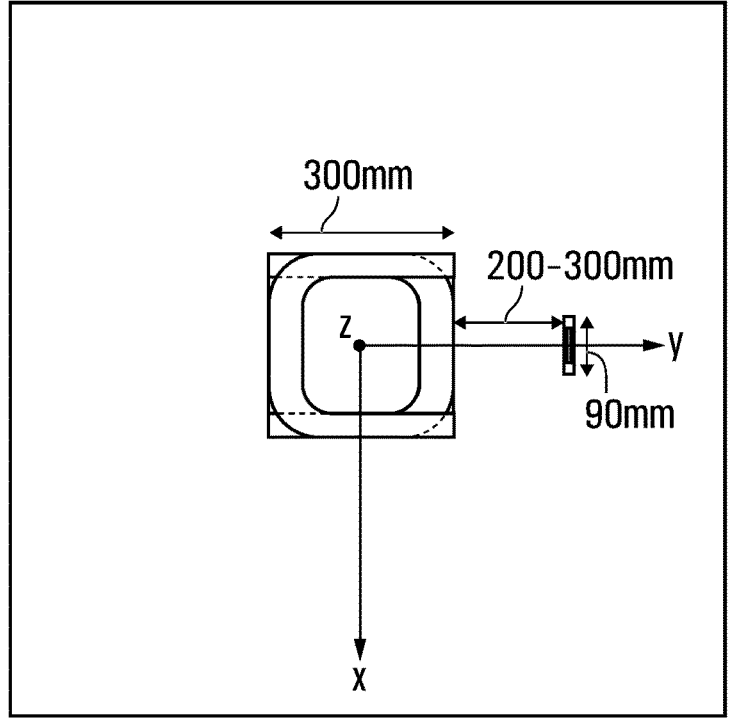
Figure 13A:
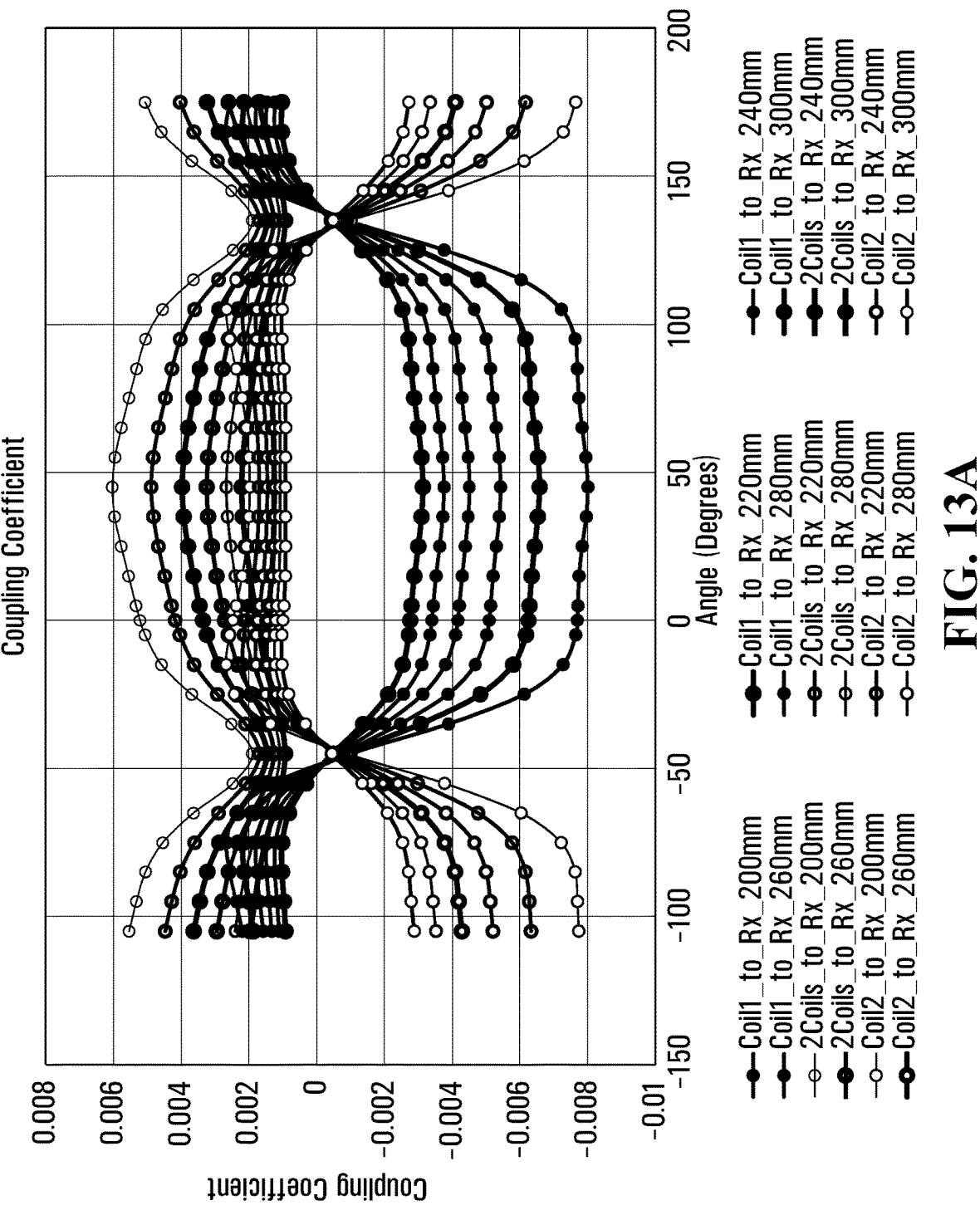
FIGS. 13A and 13B illustrate efficiency simulation graphs of the cubed 3D coil topology shown in FIGS. 12A and 12B, in accordance with an example embodiment of the present application.
Figure 13B:
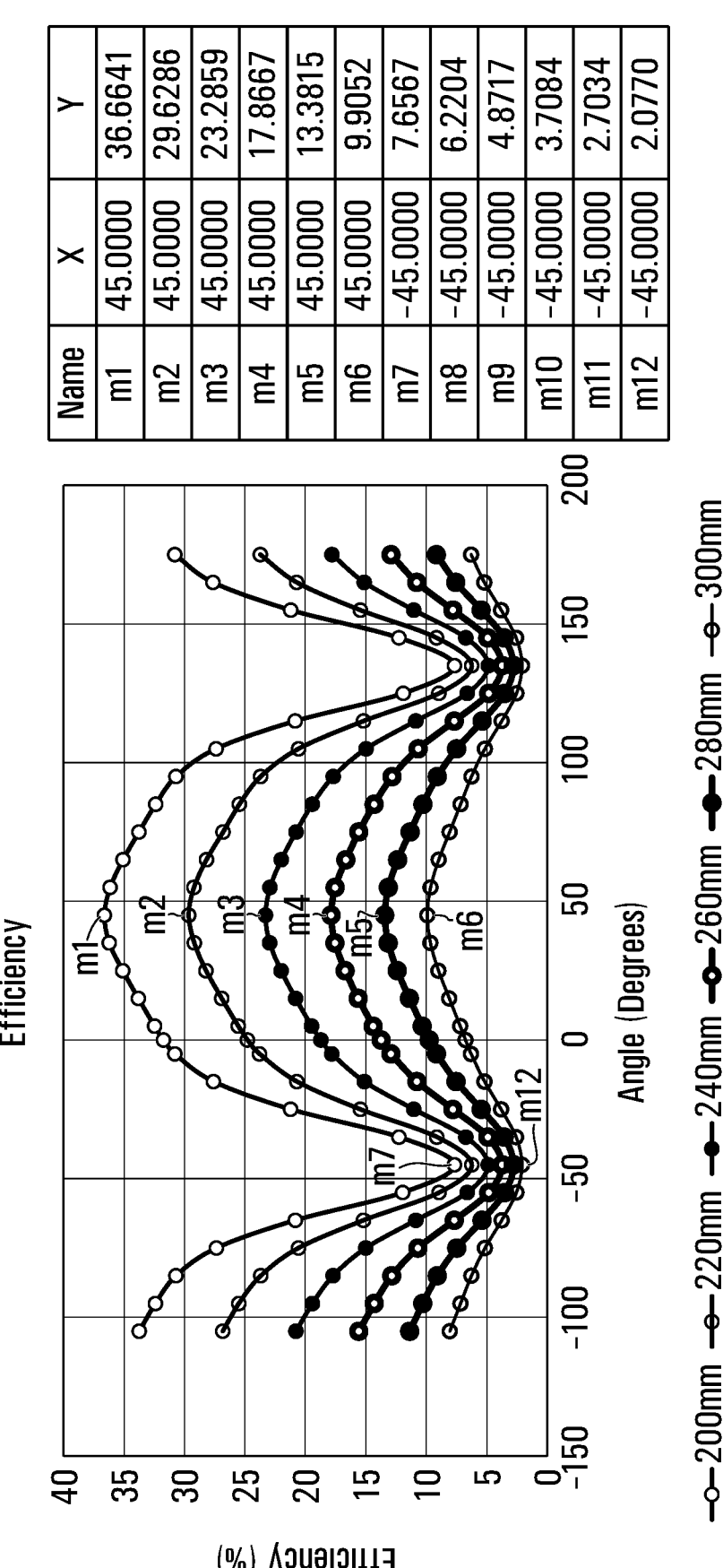

FIGS. 12A and 12B illustrate a cubed 3D coil topology with a first input feed position (e.g. PA1 input, PA2 input) in accordance with an example embodiment of the present application. As shown in FIGS. 12A and 12B, the input feed positions (e.g. PA1 and PA2) are located far apart and diagonally opposed from each other. FIGS. 13A and 13B illustrate efficiency simulation graphs of the cubed 3D coil topology shown in FIGS. 12A and 12B. In this example the input feed positions are not optimized for efficiency, the energy combination is cancelled at the receiver position, and the efficiency is lower than a one coil solution.

Figure 14A:
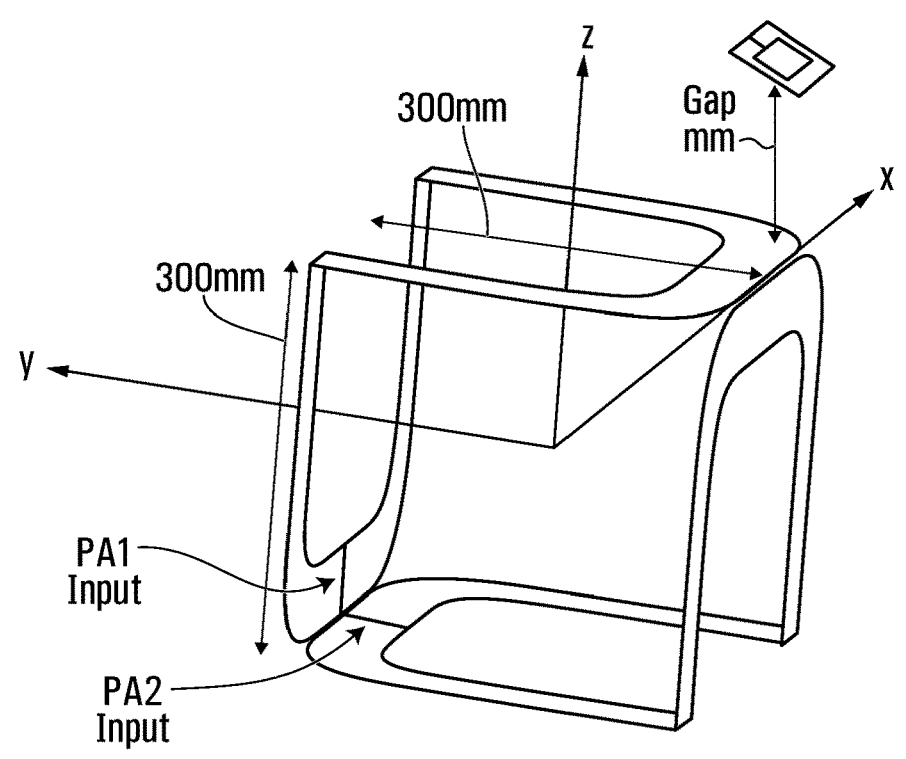
FIGS. 14A and 14B illustrate schematic diagrams of a cubed 3D coil topology with a second input feed position in accordance with an example embodiment of the present application.
Figure 14B:
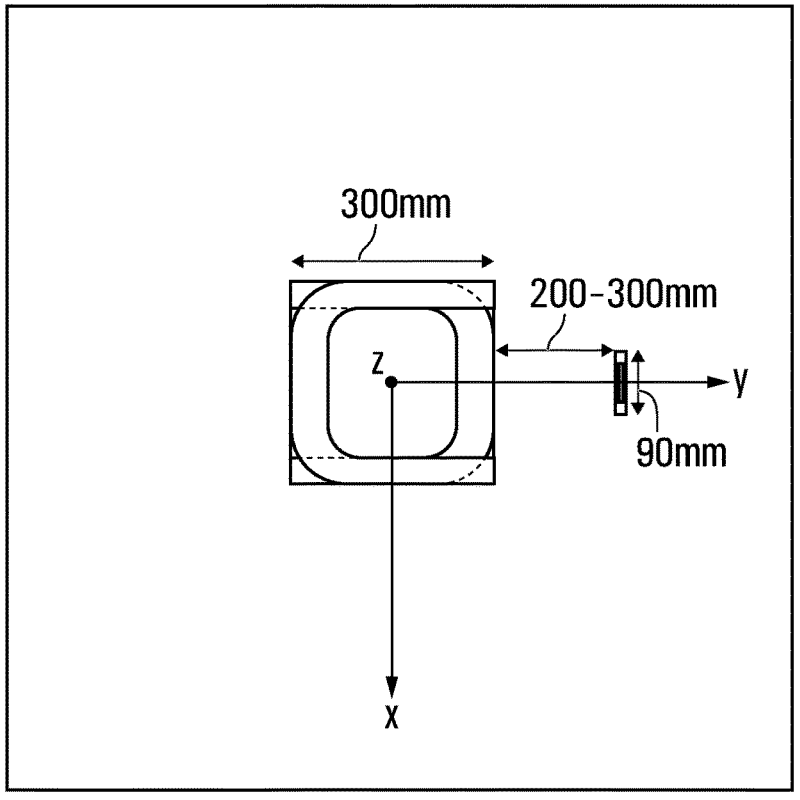
Figure 15A:
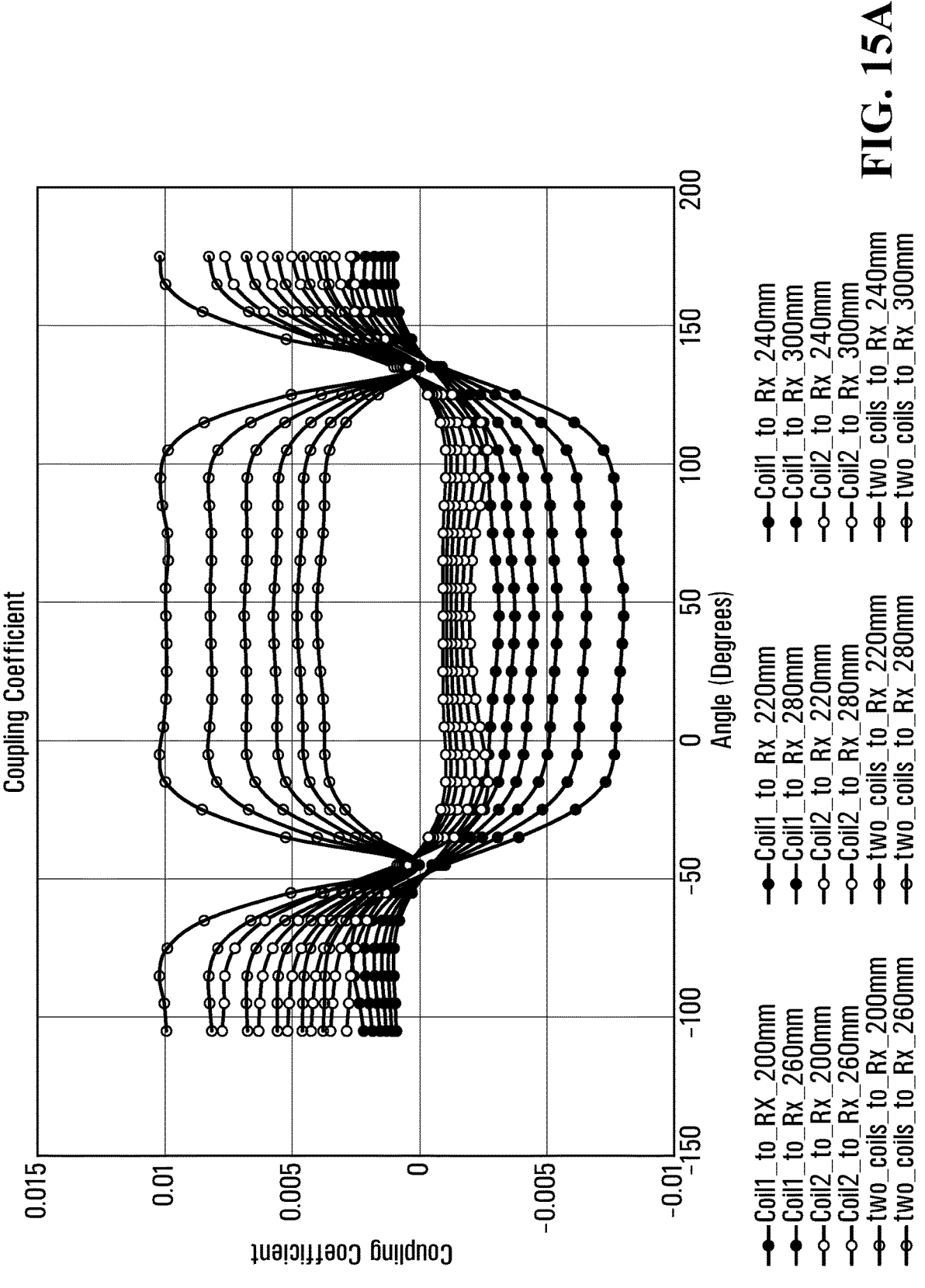
FIGS. 15A and 15B illustrate efficiency simulation graphs of the cubed 3D coil topology shown in FIGS. 14A and 14B, in accordance with an example embodiment of the present application.
Figure 15B:
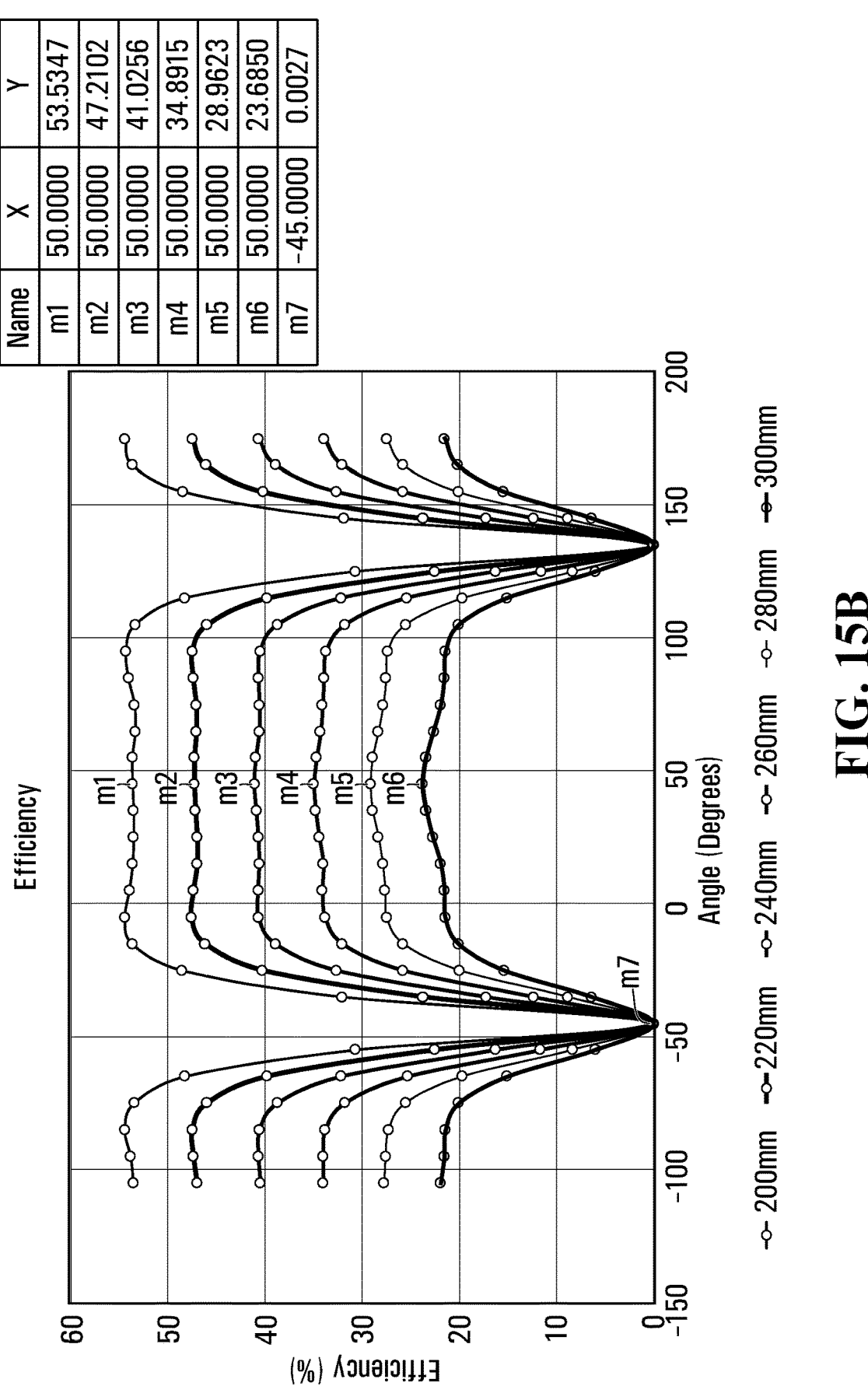

FIGS. 14A and 14B illustrate schematic diagrams of a cubed 3D coil topology with a second input feed position (e.g. PA1 input, PA2 input) in accordance with an example embodiment of the present application. As shown in FIGS. 14A and 14B, the input feed positions PA1 and PA2 are in close proximity (e.g. proximate) to each other. For example, having the input feed positions on each of the two coils located close together improves the efficiency of the coil topology. In example embodiments, to improve efficiency, the locations of the input feed positions (feed ports), are selected so that the field distribution patterns for each coil are in-phase or near in-phase with each other. For example, in some embodiments, the proximity between the input feed position of the first coil (e.g. PA1) and the input feed position of the second coil (e.g. PA2) is an important factor for the efficiency of the coil topology. Another factor that may influence the efficiency of the coil topology is the symmetry of the input feed positions on the first and second coils. Optimum positioning of the feed ports for each coil may be determined by efficiency simulations. FIGS. 15A and 15B illustrate efficiency simulation graphs of the cubed 3D coil topology shown in FIGS. 14A and 14B. In this example, the input feed positions are located close together (e.g. close proximity), the two coils have same phase distribution at the receiver position, the two coils energy is added up, and the efficiency is better than one coil.

In an example embodiment, the 3D cylindrical coil 700 shown in FIGS. 7A and 7B has a diameter between 100 mm to 200 mm. In other embodiments, the diameter of the coil 700 may be smaller or larger depending on the application and environmental conditions and requirements. The 3D charging area generated by the 3D cylindrical coil 700 is approximately two times the diameter of the cylindrical coil 700. For example, where the 3D cylindrical coil 700 has a diameter of 200 mm, the 3D charging distance around the coil is approximately 400 mm. Also shown in FIGS. 7A and 7B is an example device 705 to be charged within the 3D charging area. Multiple PRU coils (e.g. devices) may be charged within the 3D charging area generated from the 3D cylindrical coil 700.

Figure 8A:
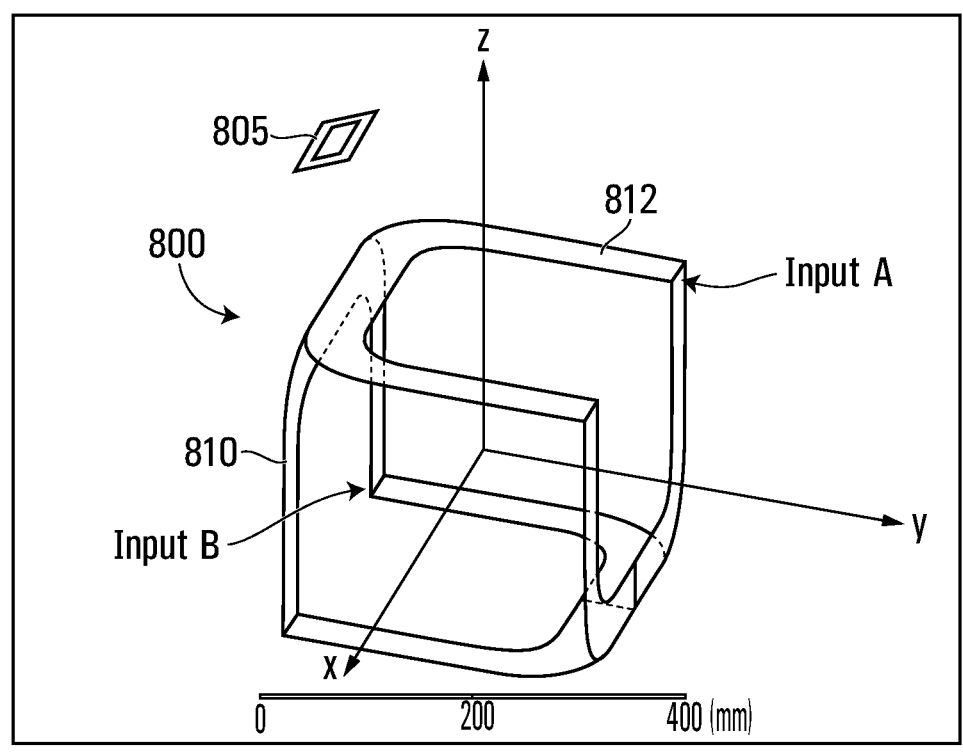
FIGS. 8A and 8B illustrate schematic diagrams of a cubed 3D coil topology in accordance with an example embodiment of the present application.
Figure 8B:
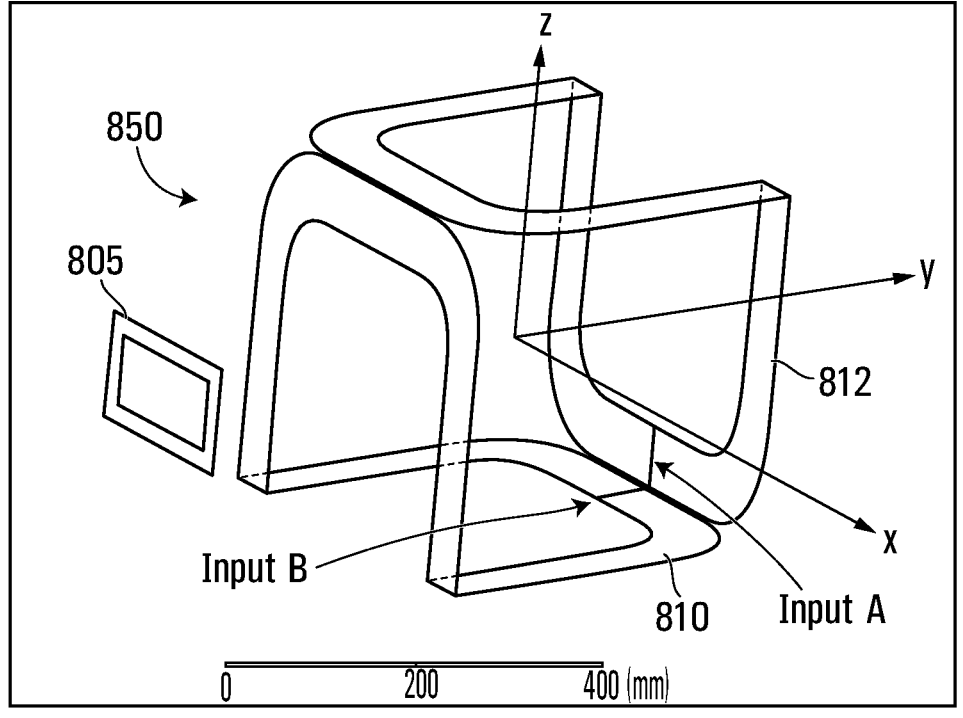

FIGS. 8A and 8B illustrate a cubic 3D coil topology in accordance with an example embodiment of the present application. FIG. 8A shows the cubic 3D coil topology 800 in a first example orientation and FIG. 8B shows the cubic 3D coil topology 800 in a second example orientation. The shape of the 3D cubic coil topology 800 is formed with a first L-shaped coil 810 and a second L-shaped coil 812. The first and second L-shaped coils 810, 812 are positioned relative to each other to create the overall cubic shape. In the example embodiment, there is a predetermined gap or space between the first and the second L-shaped coils 810, 812. For example, in some embodiments there is no more than a 10 degree gap between the first and the second L-shaped coils 810, 812 (e.g. the angle calculated from the centre point of the 3D cubic coil topology 800). The ideal gap is zero degree to cover 0 to 360 range. However, with zero degree gap the two coils will be connected together, which will cause eddy current to cancel the field distribution at the edge of two coils. The minimum gap of the two coils is two times (e.g. 2×) the trace width. However, the minimum gap may cause eddy current between the two coils, and reduce the efficiency of the coils.

FIG. 8A shows a first current input location for each of the first L-shaped coil 810 (e.g. input A) and the second L-shaped coil 812 (e.g. input B) and FIG. 8B shows a second current input location for each of the coils 810, 812 (e.g. input A, input B respectively). Having multiple coils in the charging system will generate multiple field distributions. To achieve the best efficiency, the coils input feeding position is critical to combine all the coil energy at the receiver position, and also current feeding direction. These two factors achieve the best efficiency performance a 3D charging space area. If the input feeding position and current feeding direction are not optimized, the field of multiple coil may cancel each other.

In an example embodiment, the 3D cubic coil topology 800 has a side length between 100 mm to 200 mm. In other embodiments, the side length of the coil topology 800 may be shorter or longer depending on the application and environmental conditions and requirements. The 3D charging area generated by the 3D cubic coil 800 is approximately two times the distance of the side length of the cubic coil topology 800. For example, where the 3D cubic coil topology 800 has a side length of 200 mm, the 3D charging distance around the coil is approximately 400 mm. Also shown in FIGS. 8A and 8B is an example device 805 to be charged within the 3D charging area. Multiple PRU coils (e.g. devices) may be charged within the 3D charging area generated from the 3D cubic coil topology 800.

Figure 9A:
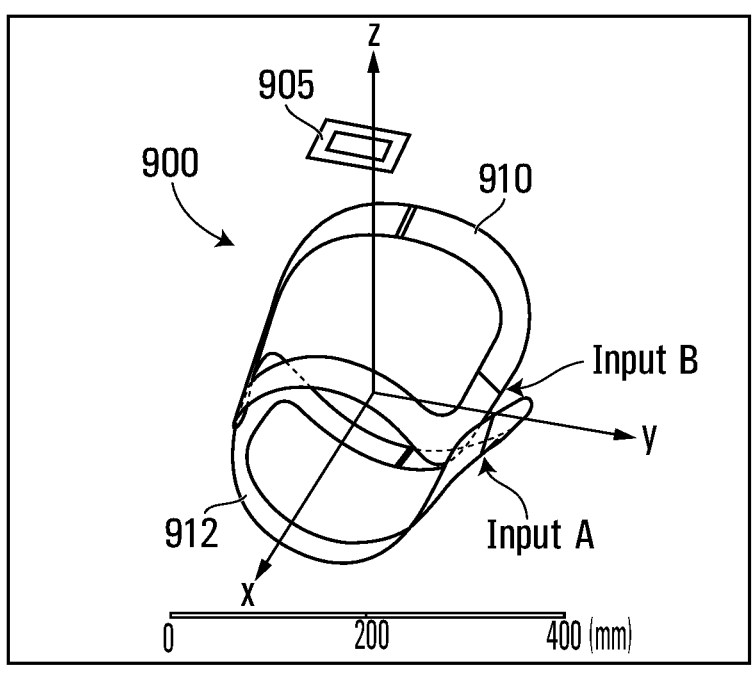
FIGS. 9A and 9B illustrate schematic diagrams of a curved 3D coil topology in accordance with an example embodiment of the present application.
Figure 9B:
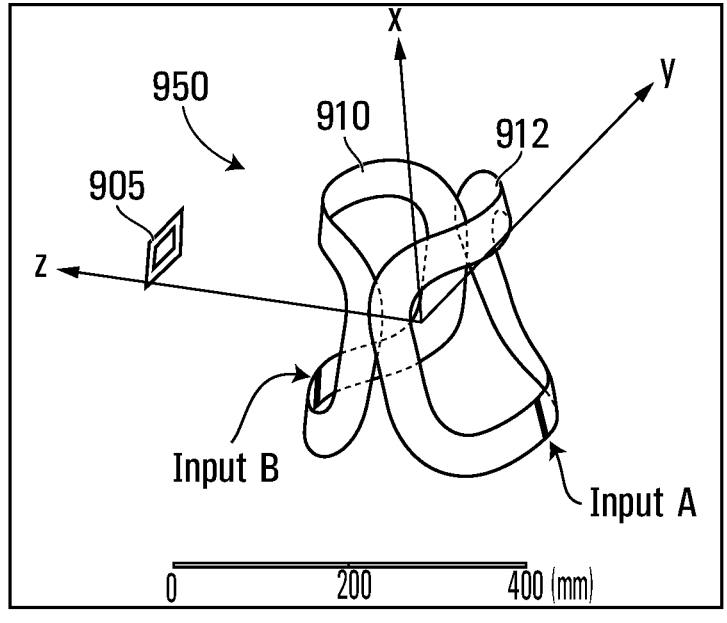

FIGS. 9A and 9B illustrate an irregular curved 3D coil topology in accordance with an example embodiment of the present application. FIG. 9A shows the curved 3D coil 900 in a first example orientation and FIG. 9B shows the curved 3D coil topology 900 in a second example orientation. The shape of the 3D curved coil topology 900 is formed with a first cone coil 910 and a second cone coil 912 The first and second cone coils 910, 912 are positioned relative to each other to create the overall curved coil shape. In the example embodiment, there is a predetermined gap or space between the first and the second cone coils 910, 912. For example, in some embodiments there is no more than a 10 degree gap between the first and the second cone coils 910, 912 (e.g. the angle calculated from the centre point of the 3D curved coil topology 900). A gap less than 10 degrees may cause eddy current between the two coils, and reduce the efficiency of the coils.

FIG. 9A shows a first current input location for each of the first cone coil 910 (e.g. input A) and the second cone coil 912 (e.g. input B) and FIG. 9B shows a second current input location for each of the coils 910, 912 (e.g. input A, input B respectively). A gap less than 10 degrees may cause eddy current between the two coils, and reduce the efficiency of the coils.

The 3D curved coil topology 900 has a first diameter at one end and a second diameter at the other end. In an example embodiment, the average diameter (e.g. average of the first and second diameters) of the 3D curved coil topology 900 is between 100 mm to 200 mm. In other embodiments, the average diameter of the coil topology 900 may be smaller or larger depending on the application and environmental conditions and requirements. The 3D charging area generated by the 3D curved coil topology 900 is approximately two times the distance of the average diameter of the curved coil topology 900. For example, where the 3D curved coil topology 900 has an average diameter of 200 mm, the 3D charging distance around the coil is approximately 400 mm. Also shown in FIGS. 9A and 9B is an example device 905 to be charged within the 3D charging area. Multiple PRU coils (e.g. devices) may be charged within the 3D charging area generated from the 3D curved coil topology 900.

Figure 10A:
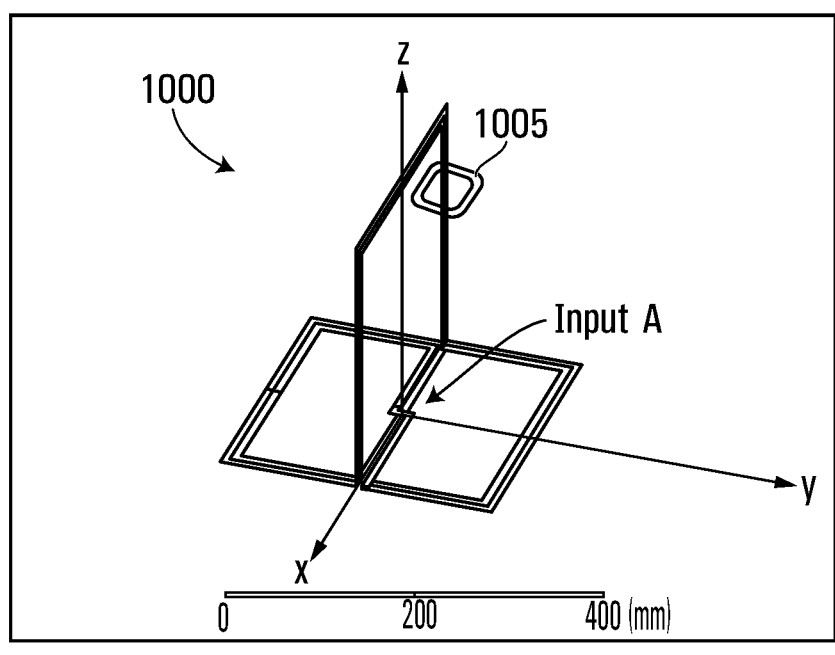
FIGS. 10A and 10B illustrate schematic diagrams of a T-shaped 3D coil topology in accordance with an example embodiment of the present application.
Figure 10B:
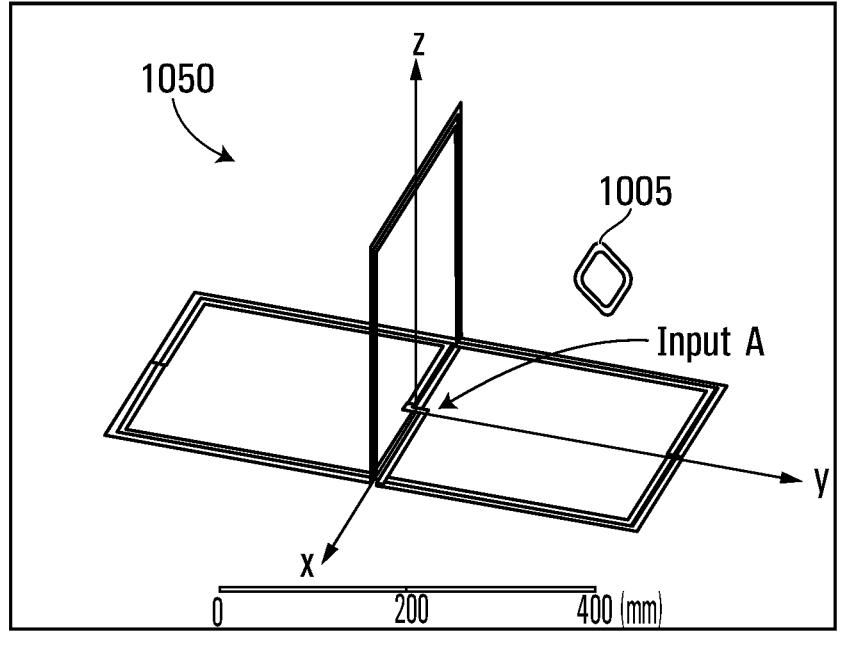

FIGS. 10A and 10B illustrate a T-shaped 3D coil topology in accordance with an example embodiment of the present application. FIG. 10A shows a first example T-shaped 3D coil topology 1000 in and FIG. 10B shows a second example T-shaped 3D coil topology 1050. The shape of the 3D T-shaped coil topology 1000 is formed with a first coil 1010 (e.g. on xy plane) and a second coil 1012 (e.g. on xz plane). The first and second coils 1010, 1012 are interconnected at 90 degrees. For example, conductive traces on each of the first and second coils are electrically interconnected to form a single, contiguous, coil.

FIGS. 10A and 10B show the input feed location (input A) on the 3D T-shaped coil topologies 1000, 1050.

In an example embodiment, the total side length of the 3D T-shaped coil topology 1000 is between 100 mm to 200 mm, and the height of the coil is approximately equal to the total side length. In other embodiments, the total side length and height of the coil topology 1000 may be shorter or longer depending on the application and environmental conditions and requirements. The 3D charging area generated by the 3D T-shaped coil topology 1000 is approximately two times the distance of the side length of the T-shaped coil topology 1000. For example, where the 3D T-shaped coil topology 1000 has a side length of 200 mm, the 3D charging distance around the coil is approximately 400 mm. Also shown in FIGS. 10A and 10B is an example device 1005 to be charged within the 3D charging area. Multiple PRU coils (e.g. devices) may be charged within the 3D charging area generated from the 3D T-shaped coil topologies 1000, 1050.

The 3D T-shaped coils 1000 and 1050 coil may be fabricated using PCB technology, in which conductive metal traces are supported by (in or on) a dielectric substrate. The T-shaped coil topologies 1000 and 1050 each combine two coil parts having physically orthogonal positions: horizontal and vertical, into a single coil, as is shown schematically in FIGS. 10A and 10B. The two parts are mechanically bonded, and the conductive traces are electrically connected. The current ITx is fed through the turns of the coil to generate the 3D field.

Figure 11A:
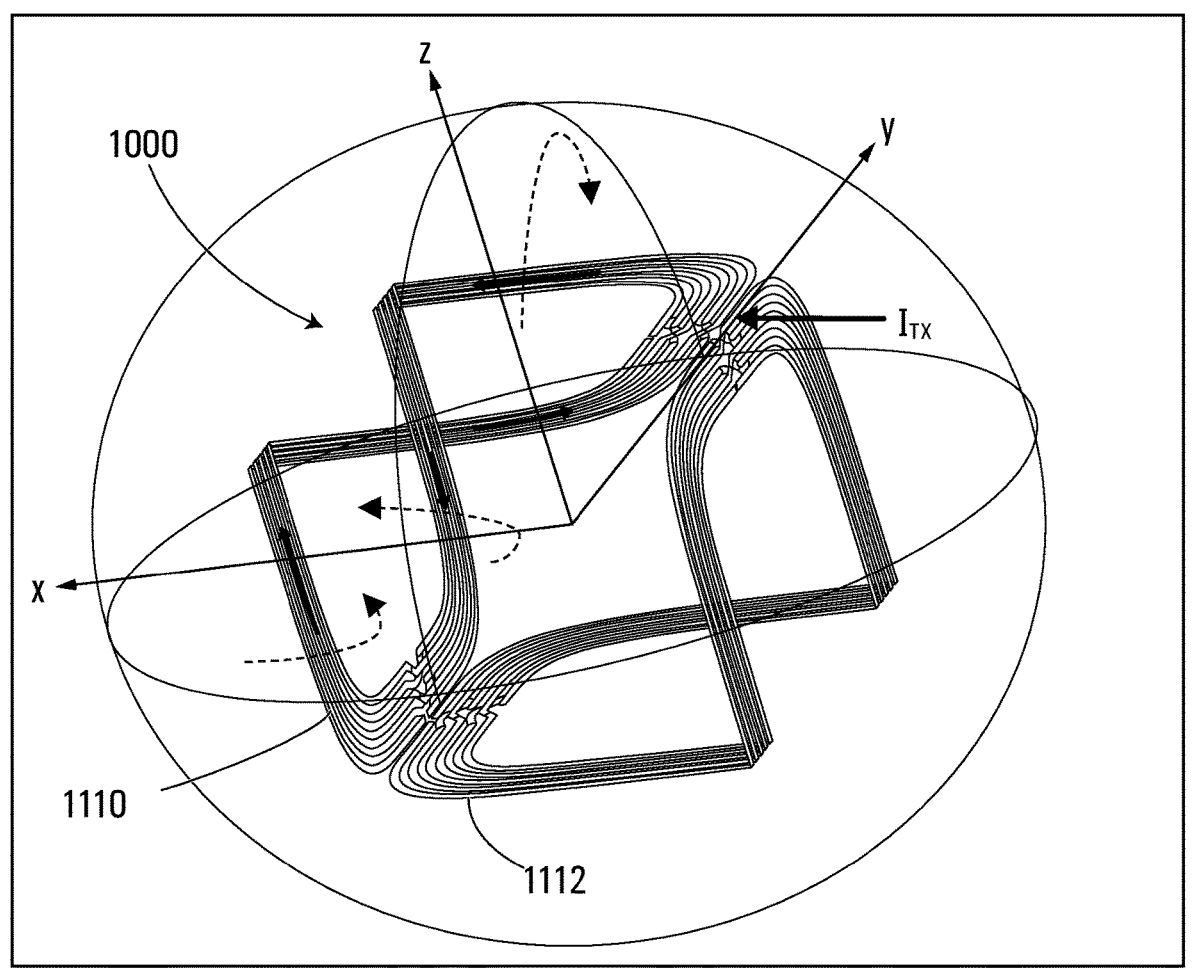
FIGS. 11A, 11B and 11C illustrate schematic diagrams of a cubed 3D coil topology in accordance with an example embodiment of the present application.
Figure 11C:
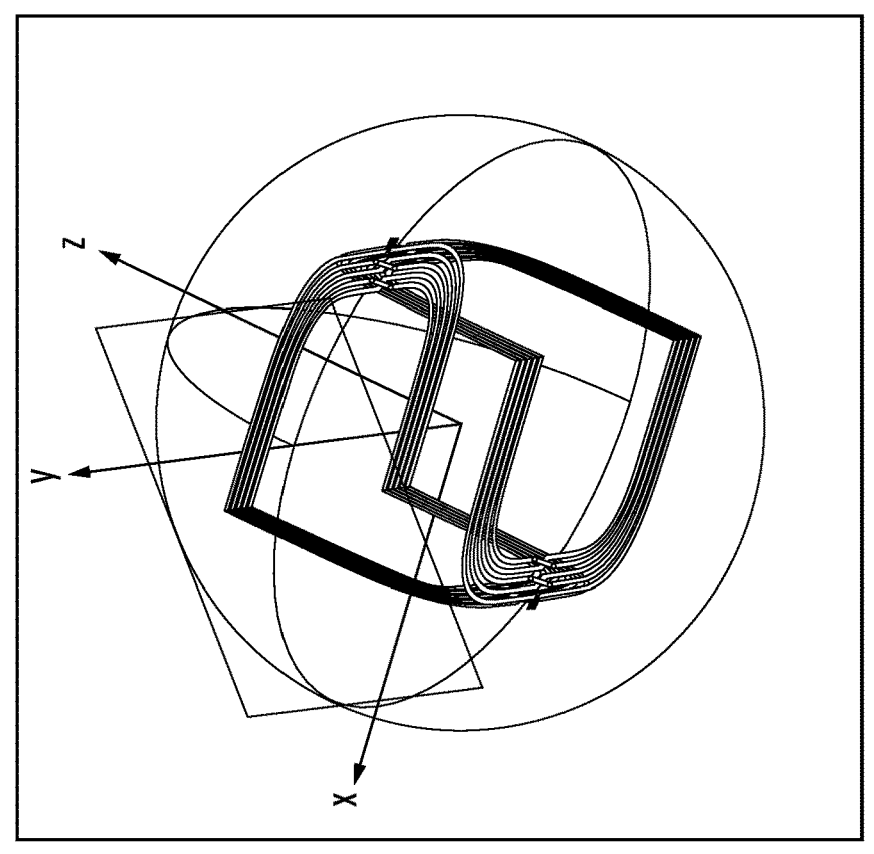
Figure 11C:
Figure 11B:
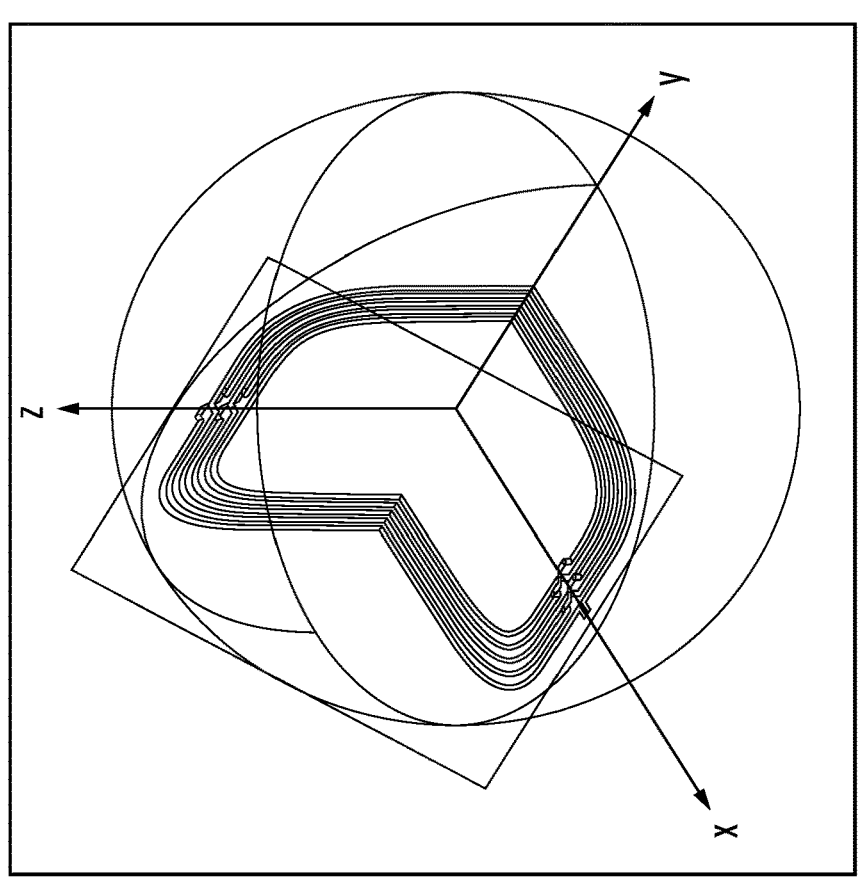

FIGS. 11A, 11B and 11C illustrate schematic diagrams of a cubed 3D coil topology in accordance with an example embodiment of the present application. The cubed 3D coil comprises the first L-shaped coil 1110 and the second L-shaped coil 1112. In the example coil topology 1100 shown in FIG. 11A, each of the first and second L-shaped coils 1110, 1112 comprise 5 turns, each part of the turns being substantially U-shaped. This topology is shown by way of example only.

The shape of the coil and dimensions of each turn are provided by way of example only. The geometry of each part loop could be varied, e.g. it could be more circular, or semi-circular, or rectangular or triangular, to provide a required magnetic field distribution, over a hemi-spherical charging space, or other required 3D charging space.

In addition to the previous example embodiments of the 3D coil topology shapes, other possible 3D topology shapes for the coils may be created (e.g. rectangular prism), including irregular 3D shapes. As well, the 3D shaped coil topologies may be formed using more than two coils (e.g. 3 individual coils used to form a 3D shaped coil topology.

Although embodiments of the inventions have been described and illustrated in detail, it is to be clearly understood that the same is by way of illustration and example only and not to be taken by way of limitation, the scope of the present invention being limited only by the appended claims.

The invention claimed is:

1. A resonant wireless power transfer (WPT) transmitter device for 3D wireless charging, the device comprising:
   a power amplifier;
   two or more coils;
   a power divider for dividing a power output of the power amplifier to each of the two or more coils, wherein the power amplifier drives the two or more coils to generate a 3D magnetic field for wirelessly charging mobile devices;
   a matching circuit for converting the power output from the power amplifier into a constant voltage source
   an impedance inversion circuit for each of the two or more coils for converting the constant voltage source into a constant current; and
   an auto-tuning circuit with sensors for reactance shift detection, wherein the auto-tuning circuit is connected between the matching circuit and the power divider.

2. The resonant WPT transmitter device of claim 1, wherein the power divider is a 1:N differential power divider, wherein N is an integer ≥2.

3. The resonant WPT transmitter device of claim 2, wherein the differential power divider is one of: a differential coupler power divider; a differential Wilkinson power divider; a differential modified Wilkinson power divider; a differential ferrite core transformer power divider.

4. The resonant WPT transmitter device of claim 1, wherein input feed positions of the two or more coils are proximate to each other.

5. The resonant WPT transmitter device of claim 4, wherein proximity of the input feed positions of the two or more coils increases an efficiency of the WPT transmitter device.

6. The resonant WPT transmitter device of claim 1, wherein the auto-tuning circuit comprises a circuit for each coil of the two or more coils for tuning the respective coil to resonant at the same frequency as a receiving coil.

7. The resonant WPT transmitter device of claim 1, comprising:
   a matching network comprising the matching circuit and impedance inversion circuits for each of the two or more coils,
   the matching circuit being connected between an output of the power amplifier and an input of the power divider, outputs of the differential power divider being connected to the two or more coils through respective impedance inversion circuits for converting the constant voltage into a constant current.

8. The resonant WPT transmitter device of claim 7, comprising for each coil, an auto-tuning circuit with sensors for reactance shift detection, wherein for each coil, the auto-tuning circuit is connected between the impedance inversion circuit and the coil.

9. A resonant wireless power transfer (WPT) system, the WPT system comprising:

a 3D coil topology comprising two or more coils for generating a 3D magnetic field over a charging area;

a power amplifier; and a differential power divider for dividing power from the power amplifier to each of the two or more coils;

a matching circuit for converting the power output from the power amplifier into a constant voltage source an impedance inversion circuit for each of the two or more coils for converting the constant voltage source into a constant current; and an auto-tuning circuit with sensors for reactance shift detection, wherein the auto-tuning circuit is connected between the matching circuit and the power divider, wherein each of the two or more coils have a feed point, and the feed points of the two or more coils are positioned so that a current feed to each coil is in-phase or near in-phase, to improve efficiency.

*   *   *   *   *